(12) United States Patent
Yigit et al.

(10) Patent No.: US 11,776,394 B2
(45) Date of Patent: Oct. 3, 2023

(54) SYSTEMS AND METHODS FOR SHARED PARKING PERMIT VIOLATION DETECTION

(71) Applicant: GENETEC INC., St-Laurent (CA)

(72) Inventors: Chris Yigit, Pierrefonds (CA); Jean Lambert, Sainte-Catherine (CA); Mathieu Nadeau, Montréal (CA); Yannick Aublet, Montréal (CA); Guy Brousseau, Laval (CA); Christophe Commeyne, Montréal (CA)

( * ) Notice: Subject to any disclaimer, the term of this patent is extended or adjusted under 35 U.S.C. 154(b) by 50 days.

(21) Appl. No.: 17/072,362

(22) Filed: Oct. 16, 2020

(65) Prior Publication Data
US 2021/0035439 A1 Feb. 4, 2021

Related U.S. Application Data

(63) Continuation of application No. 15/780,321, filed as application No. PCT/CA2016/051404 on Nov. 30, 2016, now abandoned.
(Continued)

(51) Int. Cl.
*G08G 1/017* (2006.01)
*G07B 15/02* (2011.01)
(Continued)

(52) U.S. Cl.
CPC ............ *G08G 1/017* (2013.01); *G06T 7/292* (2017.01); *G06V 20/56* (2022.01); *G07B 15/02* (2013.01);
(Continued)

(58) Field of Classification Search
CPC ........ G08G 1/017; G08G 1/0175; G08G 1/04; G01S 19/13; G08C 17/02; G06T 7/292;
(Continued)

(56) References Cited

U.S. PATENT DOCUMENTS 5,153,586 A 10/1992 Fuller
6,081,206 A * 6/2000 Kielland ............ G06Q 30/0284
194/902

(Continued)

FOREIGN PATENT DOCUMENTS

CN 103247179 A 8/2013
CN 105551297 B 9/2016
(Continued)

OTHER PUBLICATIONS

International application No. PCT/CA2016/051404 International Preliminary Report on Patentability Chapter II dated Apr. 13, 2018.
(Continued)

*Primary Examiner* — Fadey S. Jabr
*Assistant Examiner* — Mohamed Abdo Algehaim

(57) ABSTRACT

Provided is a technology that allows, inter alia, two different patrol-vehicles to be used to enforce parking regulations. Unique systems and methods, inter alia, allow a patrol vehicle or the like to collect parking data pertaining to parked vehicles, and to wirelessly transmit such parking data to a server. A later patrol vehicle or the like can wirelessly receive parking data related to parking events related to its parking enforcement situation and determine whether parking violations, such as overtime or permit sharing violations, are occurring using a combination of parking data generated locally and extraneous parking data collected by the previous patrol vehicle.

26 Claims, 19 Drawing Sheets

Related U.S. Application Data

(60) Provisional application No. 62/261,432, filed on Dec. 1, 2015.

(51) Int. Cl.
| | |
|---|---|
| *G08G 1/04* | (2006.01) |
| *G06V 20/56* | (2022.01) |
| *G06T 7/292* | (2017.01) |
| *H04W 4/44* | (2018.01) |
| *G06V 20/62* | (2022.01) |
| *G01S 19/13* | (2010.01) |
| *G08C 17/02* | (2006.01) |

(52) U.S. Cl.
CPC ............ *G08G 1/0175* (2013.01); *G08G 1/04* (2013.01); *H04W 4/44* (2018.02); *G01S 19/13* (2013.01); *G06T 2207/10024* (2013.01); *G06T 2207/10048* (2013.01); *G06T 2207/30264* (2013.01); *G06V 20/625* (2022.01); *G08C 17/02* (2013.01)

(58) Field of Classification Search
CPC ........... G06T 2207/10048; G06T 2207/30264; G06K 9/00791; G06K 2209/15; G07B 15/02; H04W 4/44; G06V 20/56; G06V 20/625
USPC ........................................................ 701/117
See application file for complete search history.

(56) References Cited

U.S. PATENT DOCUMENTS

| | | | |
|---|---|---|---|
| 6,243,029 B1 | 6/2001 | Tomer | |
| RE38,626 E | 10/2004 | Kielland | |
| 7,104,447 B1 | 9/2006 | Lopez et al. | |
| 7,355,527 B2 | 4/2008 | Franklin et al. | |
| 7,791,501 B2 | 9/2010 | Ioli | |
| 8,022,845 B2 | 9/2011 | Zlojutro | |
| 8,219,442 B2 * | 7/2012 | Johnson ................. | G07B 15/00 705/13 |
| 8,451,142 B2 * | 5/2013 | Groft ....................... | G08G 1/14 340/933 |
| 8,760,318 B2 | 6/2014 | Sirota et al. | |
| 9,147,345 B2 | 9/2015 | Agrait et al. | |
| 9,773,413 B1 | 9/2017 | Li et al. | |
| 9,792,818 B2 | 10/2017 | Aggarwal et al. | |
| 9,809,196 B1 | 11/2017 | Penilla et al. | |
| 10,783,786 B2 | 9/2020 | Franklin et al. | |
| 10,817,814 B2 * | 10/2020 | Stefik ............ | G06Q 10/063114 |
| 11,151,494 B2 | 10/2021 | Singhal et al. | |
| 11,157,860 B2 | 10/2021 | Stefik et al. | |
| 11,200,756 B2 * | 12/2021 | Hohenacker .......... | G07C 5/008 |
| 11,417,210 B1 | 8/2022 | Li et al. | |
| 2002/0008639 A1 | 1/2002 | Dee | |
| 2003/0135407 A1 | 7/2003 | Reinhardt et al. | |
| 2004/0143602 A1 | 7/2004 | Ruiz et al. | |
| 2005/0073436 A1 * | 4/2005 | Negreiro ................ | G08G 1/017 340/937 |
| 2006/0129500 A1 | 6/2006 | Mandy et al. | |
| 2006/0255119 A1 | 11/2006 | Marchasin et al. | |
| 2007/0029825 A1 | 2/2007 | Franklin et al. | |
| 2007/0046484 A1 | 3/2007 | Bucholz et al. | |
| 2007/0083424 A1 | 4/2007 | Lang et al. | |
| 2008/0015930 A1 * | 1/2008 | Mougin ................. | G07B 15/02 705/13 |
| 2008/0218383 A1 | 9/2008 | Frankln et al. | |
| 2009/0227240 A1 * | 9/2009 | Sheets ................. | G06F 3/03545 455/414.2 |
| 2010/0211340 A1 | 8/2010 | Lowenthal et al. | |
| 2010/0328103 A1 | 12/2010 | Goldman et al. | |
| 2011/0063135 A1 * | 3/2011 | Graft ....................... | G07B 15/02 340/933 |
| 2011/0099126 A1 * | 4/2011 | Belani ..................... | G08G 1/14 705/418 |
| 2011/0210827 A1 * | 9/2011 | Lidror .................... | G07B 15/02 340/10.1 |
| 2011/0276370 A1 | 11/2011 | Agrait et al. | |
| 2012/0007983 A1 | 1/2012 | Welch | |
| 2012/0053998 A1 * | 3/2012 | Redmann .............. | G07B 15/02 705/13 |
| 2012/0188101 A1 * | 7/2012 | Ganot .................... | G07B 15/02 340/932.2 |
| 2012/0209667 A1 * | 8/2012 | Johnson ................ | G07B 15/02 705/13 |
| 2012/0215595 A1 * | 8/2012 | Johnson ................ | G06Q 10/00 705/13 |
| 2012/0215596 A1 * | 8/2012 | Johnson ................ | G07B 15/02 705/13 |
| 2012/0245966 A1 | 9/2012 | Volz | |
| 2013/0141253 A1 | 6/2013 | Sirota et al. | |
| 2013/0262275 A1 * | 10/2013 | Outwater ............... | G06Q 50/30 705/13 |
| 2013/0265423 A1 | 10/2013 | Bernal et al. | |
| 2014/0039987 A1 | 2/2014 | Nerayoff et al. | |
| 2014/0140578 A1 | 5/2014 | Ziola et al. | |
| 2014/0270383 A1 | 9/2014 | Pederson | |
| 2014/0343891 A1 * | 11/2014 | Becker ................... | G08G 1/042 702/150 |
| 2015/0066608 A1 * | 3/2015 | Groft ....................... | G06Q 50/30 705/13 |
| 2015/0177002 A1 * | 6/2015 | Sourani ................. | G08G 1/147 701/532 |
| 2015/0179070 A1 * | 6/2015 | Sandbrook ............. | G08G 1/149 340/932.2 |
| 2015/0317840 A1 | 11/2015 | Dutta et al. | |
| 2016/0078759 A1 * | 3/2016 | Nerayoff ................ | G06T 7/248 701/3 |
| 2016/0180712 A1 | 6/2016 | Rosen et al. | |
| 2016/0189435 A1 | 6/2016 | Beaurepaire | |
| 2016/0253847 A1 * | 9/2016 | Ullrich .................. | G08G 1/065 705/13 |
| 2016/0292929 A1 | 10/2016 | Konks | |
| 2017/0109942 A1 | 4/2017 | Zvkovc et al. | |
| 2017/0150307 A1 | 5/2017 | Himmelreich et al. | |
| 2017/0161961 A1 * | 6/2017 | Salsberg ................. | G07B 1/08 |
| 2017/0186317 A1 | 6/2017 | Franklin et al. | |
| 2017/0213456 A1 * | 7/2017 | Finschi ................. | G06K 7/1413 |
| 2017/0330460 A1 * | 11/2017 | Massey ................ | G08G 1/0175 |
| 2018/0060798 A1 | 3/2018 | Stefik et al. | |
| 2018/0276700 A1 | 9/2018 | Wang | |
| 2019/0043355 A1 * | 2/2019 | Ferguson ........... | G01C 21/3438 |
| 2020/0005640 A1 * | 1/2020 | Botman ................ | H04W 4/021 |

FOREIGN PATENT DOCUMENTS

| | | |
|---|---|---|
| CN | 107067811 A | 8/2017 |
| CN | 107424226 A | 12/2017 |
| CN | 108898885 A | 11/2018 |
| CN | 107609932 A | 1/2019 |
| CN | 110047157 A | 7/2019 |
| DE | 102015216315 A1 | 3/2017 |
| KR | 20180088098 A | 8/2018 |
| WO | 2017/091894 A1 | 6/2017 |

OTHER PUBLICATIONS

International application No. PCT/CA2016/051404 International Search Report dated Mar. 7, 2017.
International application No. PCT/CA2016/051404 Search Strategy dated Mar. 7, 2017.
International application No. PCT/CA2016/051404 Written Opinion of the International Searching Authority dated Mar. 7, 2017.
European application No. 16869439.6 extended European search report dated Jun. 26, 2019.
European application No. 16869439.6 extended European examination opinion dated Jun. 26, 2019.
Related U.S. Appl. No. 17/076,118 Office Action dated Dec. 23, 2020.
Related European application No. 20203187.8 European search report and search opinion dated Feb. 12, 2021.

(56) References Cited

OTHER PUBLICATIONS

Related U.S. Appl. No. 17/076,118 Office Action dated Apr. 14, 2021.
Related Canadian application No. 3006878 Examiner Requisition dated Feb. 9, 2023.
Related U.S. Appl. No. 17/076,323 Office Action dated Nov. 30, 2022.
Related European application No. 16869439.6 European examination opinion dated Mar. 11, 2022.
Related European application No. 20203187.8 Communication about intention to grant a European patent dated Feb. 14, 2023.
Related U.S. Appl. No. 15/780,321 Office Action dated Jul. 22, 2021.
Related Canadian application No. 3,006,878 Office Action dated Jul. 20, 2023.
Related U.S. Appl. No. 17/076,118 Notice of allowance dated May 24, 2023.

* cited by examiner

SYSTEMS AND METHODS FOR SHARED PARKING PERMIT VIOLATION DETECTION

CROSS-REFERENCE TO RELATED APPLICATION

This application is a continuation of U.S. patent application Ser. No. 15/780,321 filed on May 31, 2018, that is a 371 application of International PCT application No. PCT/CA2016/051404 filed on Nov. 30, 2016 that claims priority on U.S. provisional patent application No. 62/261,432 having a filing date of Dec. 1, 2016, the contents of which are hereby incorporated by reference in their entirety.

TECHNICAL FIELD

The present technology relates to the field of parking enforcement system. More particularly the present technology relates to mobile, e.g. vehicle-bound, systems for parking enforcement which rely on data acquired in situ to ascertain the existence of parking violations such as the violation of parking rules forbidding a particular length of stay. The present technology may also relate to operations where multiple mobile systems are used.

BACKGROUND

Although the majority of motorists are law-abiding with respect to obeying municipal parking restriction regulations, enough of them routinely—whether deliberately or not—don't. This causes problems for otherwise law abiding motorists. Therefore parking regulations enforcement is an important part of the administration of parking areas.

In the past, one aspect of parking regulations enforcement consisted of ensuring a motorist respected maximum parking periods typically by using chalk to "chalk" the tire of a vehicle and/or the asphalt to ascertain its position and returning some time later to determine whether the vehicle moved in the intervening time period. Other prior art systems include honor based system employing a user-set parking time indicator such as a parking disc.

SUMMARY

Provided are systems, methods and more broadly technology as described herein.

In accordance with one exemplary embodiment is provided a virtual chalking module for creating locally-created virtual chalking data comprising location information of a vehicle and at least one additional information, the vehicle-based virtual chalking module comprising an input for receiving from a remote vehicle remotely-created virtual chalking data.

In accordance with another exemplary embodiment is provided a method of detecting parking violation comprising at a first device at a first time, generating first parking data concerning a parked vehicle, the parking data comprising location information, time information and a vehicle image; at a second device at a second time, generating second parking data; detecting a parking violation using at least a portion of the first parking data and at least a portion of second parking data to detect a parking violation.

In accordance with another exemplary embodiment is provided a method for in-the-field parking enforcement executed on a mobile parking enforcement device. The parking enforcement device comprises: a) a wireless interface for communicating wirelessly with a remote parking enforcement server, b) a parking data acquisition hardware interface for communicating with parking data acquisition hardware for receiving therefrom parking data pertaining to nearby vehicles, c) a processing device in communication with the wireless interface and the parking data acquisition hardware, and d) computer-readable memory in communication with and accessible by the processing device. The method comprises: a) receiving at the wireless interface from said remote parking enforcement server a set of at least one extraneous past parking events each comprising parking data corresponding to a extraneous past parking event for a particular vehicle including at least a vehicle identifier for the particular vehicle and one other parking parameter, b) receiving at the parking data acquisition hardware interface parking data pertaining to a nearby vehicle, the parking data comprising at least a vehicle identifier and one other parking parameter for the nearby vehicle and generating at the processing device a parking event using with acquired parking data, c) at the processing device, searching said at least one extraneous past parking events and identifying a match between a particular extraneous past parking event and the parking event generated at the processing device on the basis of their respective parking data and determining at least in part on the basis of the parking data of the matched parking events that a parking violation has occurred, and d) at the processing device generating a violation event and storing said violation event in said computer-readable memory.

DESCRIPTION

In a modern parking enforcement system, a patrol vehicle may comprise equipment to photograph a series of parked vehicles, including license plates and detailed pictures of the parked vehicles' tires (e.g. tire well and stem valve), and collects time and location information for each (e.g. via GPS), combining the two. The same patrol vehicle visiting the same city block some time later carries out a second data collection and combination for the series of vehicles encountered during the latter patrol.

Figure 1:
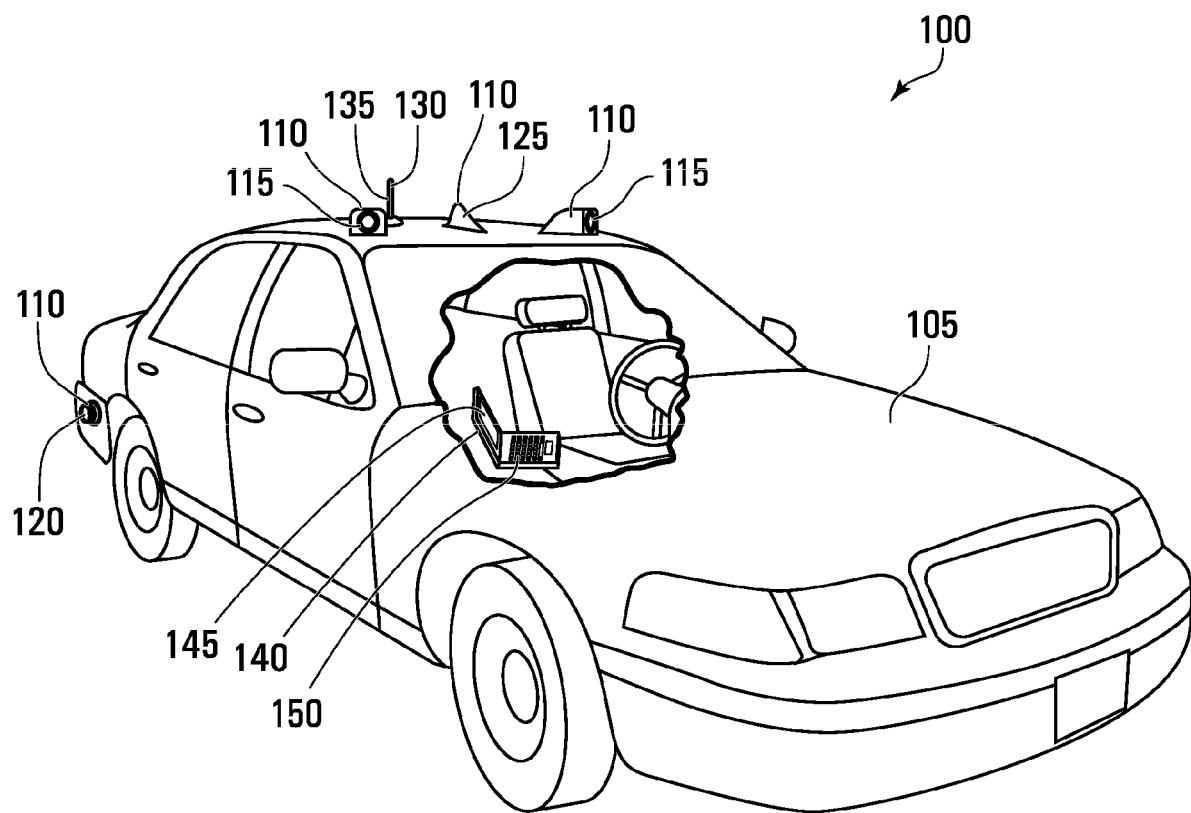
FIG. 1 is a perspective view of a parking enforcement system according to a particular example, mounted on a patrol vehicle.

FIG. 1 shows an exemplary patrol vehicle 105 equipped with a parking enforcement system 100. A block diagram of the parking enforcement system 100 is shown in FIG. 2. The parking enforcement system 100 comprises parking data acquisition hardware 110 which in this example includes a license plate and context camera 115, a tire camera 120 and a GPS unit 125. In this example, the parking data acquisition hardware comprises a trunk unit 111 which aggregates data from various cameras and performs some image processing and analysis, generates plate read events and configures video streams and data for viewing and processing by the parking enforcement device 101. As the name implies, the trunk unit 111 is typically mounted in the trunk of the vehicle, however this should not be regarded as a limitation, as the trunk unit 111 may be mounted elsewhere. The parking enforcement system 100 further comprises a wireless communication device 130 which, as shown, typically includes an antenna 135. The parking enforcement system 100 of this example also comprises a user interface system 140 which includes a display 145 and a user input device 150.

The user interface system 140 of this example comprises a computer 141, which in this example is a laptop computer and more specifically a Panasonic Toughbook® running a Windows® 10 operating system. In this example, the display 145 comprises the laptop display and the input device 150 comprises the laptop keyboard, although a skilled person will clearly understand that other input devices may be used/provided and that external displays may likewise be provided and used.

The parking enforcement system 100 is a mobile parking enforcement system 100, which can be moved in order to bring it in situ to the location of parked vehicles to monitor and/or enforce parking in the field. In the example shown in FIG. 1, the parking enforcement system 100 is mounted to a standard vehicle, in this case an automobile 106.

The parking data acquisition hardware comprises hardware suitable for acquiring from a nearby parked vehicle, a vehicle identifier. In the present example, the license plate ID may be used as vehicle identifier. The license plate ID in this example comprises the unique character (here, numbers and letters) combination of the license plate and may also include a license plate context such as the jurisdiction (e.g. state/province/country) of issuance of the license plate. Accordingly, the parking data acquisition hardware comprises hardware suitable for acquiring a license plate number. In the present example, the parking enforcement system 100 comprises the AutoVu™ automatic license plate recognition (ALPR) system by Genetec Inc. with SharpX cameras, also by Genetec Inc. which capture both color images with a resolution of 640×480 and monochrome images captured using infrared camera in resolution ranging from 640×480 to 1280×808. In this example, the SharpX camera is suited not only to capture vehicle license plates, but also context images showing the vehicle in its parking spot.

Figure 3:
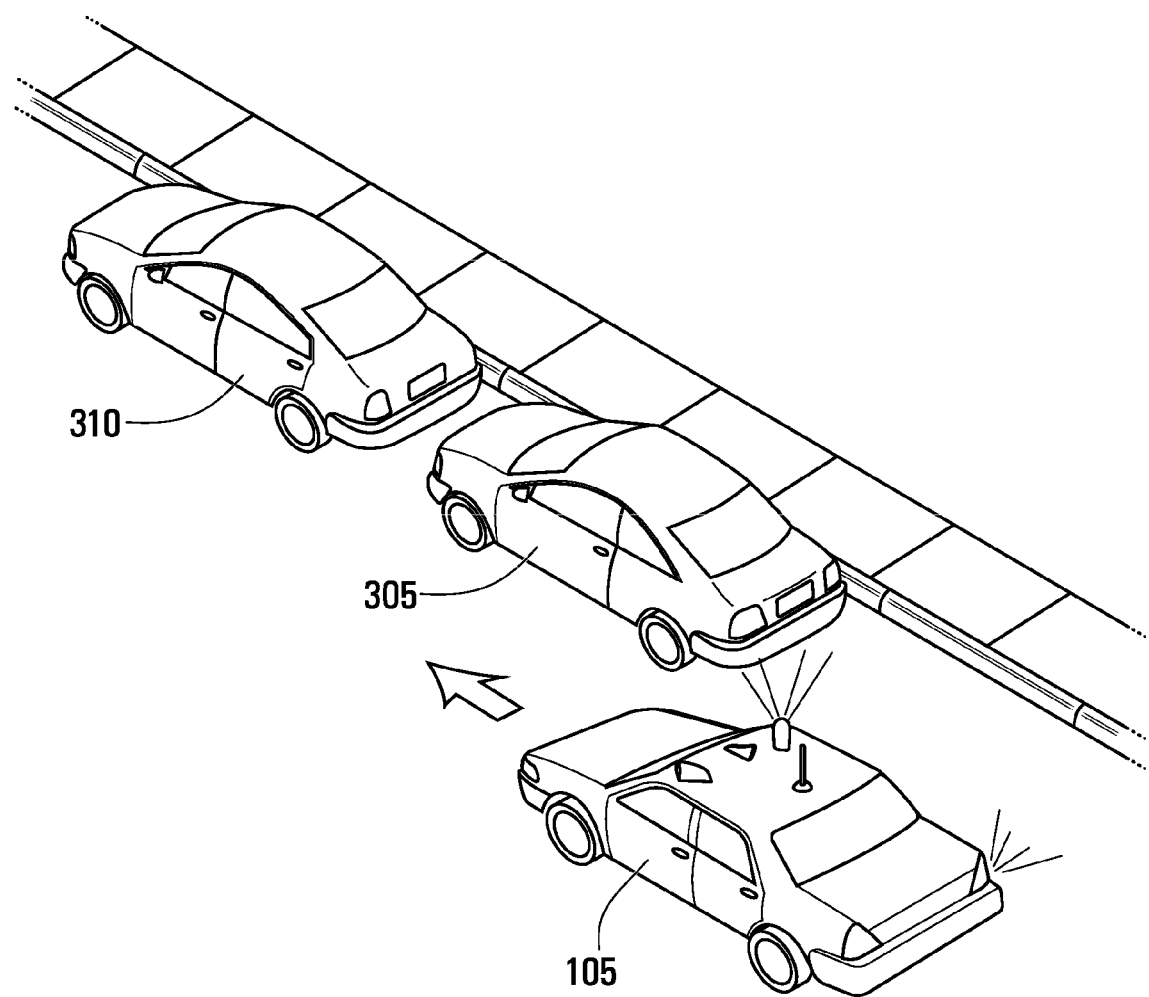
FIG. 3 is a perspective view of the patrol vehicle of FIG. 1 executing parking enforcement with the parking enforcement system.

Thus the parking data acquisition hardware also comprises hardware suitable for acquiring context data, which in this case includes color images of parked vehicles. The license plate and context camera 115 also serves in this role. The license plate and context camera 115 has a color camera lens angle allowing the capture of a parked vehicle and its surrounding when the parked vehicle is nearby the patrol vehicle 105, as shown in FIG. 3. Thus the color image camera in the license plate and context camera 115 can capture images showing context in terms of where the parked vehicle was parked, in some instances a parking spot number marking, and generally gather other visual information which may serve as evidence of a parking violation.

In the example shown in FIG. 1, the parking enforcement system 100 actually comprises two license plate and context cameras 115, one for each side of the vehicle 105. This allows the vehicle 105 to read license plates of nearby vehicles on either side of the vehicle 105. For simplicity, the system will be described with reference to only one license plate and context camera 115 however it will be appreciated that the parking data may be obtained from either one, or both, of these license plate and context cameras 115. Moreover, additional license plate and context cameras 115 may be provided to cover additional angles.

The parking data acquisition hardware 110 of the parking enforcement system 100 of this example further comprises a tire camera 120 which provides additional context data. The tire camera 120 is mounted on the vehicle 105 in a location allowing it to capture images of the tires of nearby parked vehicles. In the example shown in FIG. 1, the tire camera 120 is mounted in the fender of the vehicle 105. However, in other embodiments the tire camera 120 may be mounted elsewhere, such as in a bumper or bumper cover of the vehicle 105 or another easily replaceable part such that providing the tire camera 120 to the vehicle 105 can be accomplished by installing such a replaceable part having the tire camera already mounted therein.

As with the license plate and context camera 115, the parking enforcement system of this example comprises two tire cameras 120, one on either side of the vehicle 105. This allows the vehicle 105 to capture images of tires on either side of the vehicle 105. Again for simplicity, the system will be described with reference to only one tire camera 120 however it will be appreciated that the tire images may be obtained from either one of these tire cameras 120.

The parking enforcement system 100 of this example comprises parking localisation hardware, in this example the GPS unit 125. The GPS unit 125 of this example comprises a GPS antenna and a GPS receiver that receives GPS signals from the GPS antenna and computes a spatial location based thereon. In alternate embodiments, the GPS unit 125 may be augmented by a dead-reckoning system such as one that uses an odometer tap to increase the accuracy of GPS localisation.

The parking enforcement system 100 of this example comprises a user interface system 140 to interface with a user, e.g. a parking enforcement agent in the vehicle 105, and comprises a display 145 and a user input device 150. In the particular example shown here, the parking enforcement system 100 comprises a display monitor and a keyboard input. However, in other examples a laptop computer may be provided in the vehicle 105 and may provide the user interface system 140 with its display and input devices. Other hardware may be used, such as touch screens or other specialized interface devices, as well as tablet computer hardware or the like.

The parking enforcement system 100 comprises a wireless communication device 130 for communicating wirelessly with a remote parking enforcement server. The wireless communication device 130 of this example is a cellular communication device and more particularly comprises a cell-phone type modem which has internet connectivity over a cellular network using the LTE or 3G protocols. Typical embodiments of this are what is generally referred to as a 3G router/switch. This device has enabled cellular capability with a SIM card and acts as a wireless internet provider line. This device provides internet connectivity to the rest of the components in the vehicle's internal cabled network. The enforcement system and Sharp cameras are all connected to this router/switch and just have internet connectivity. It is transparent to each device.

In certain embodiments, a VPN channel may be used between the parking enforcement system 100 and the parking enforcement server 605 (or other backend server) to secure any parking data exchanged over the public internet. In other embodiment a private and secured dedicated cellular network may be used instead.

Figure 2A:
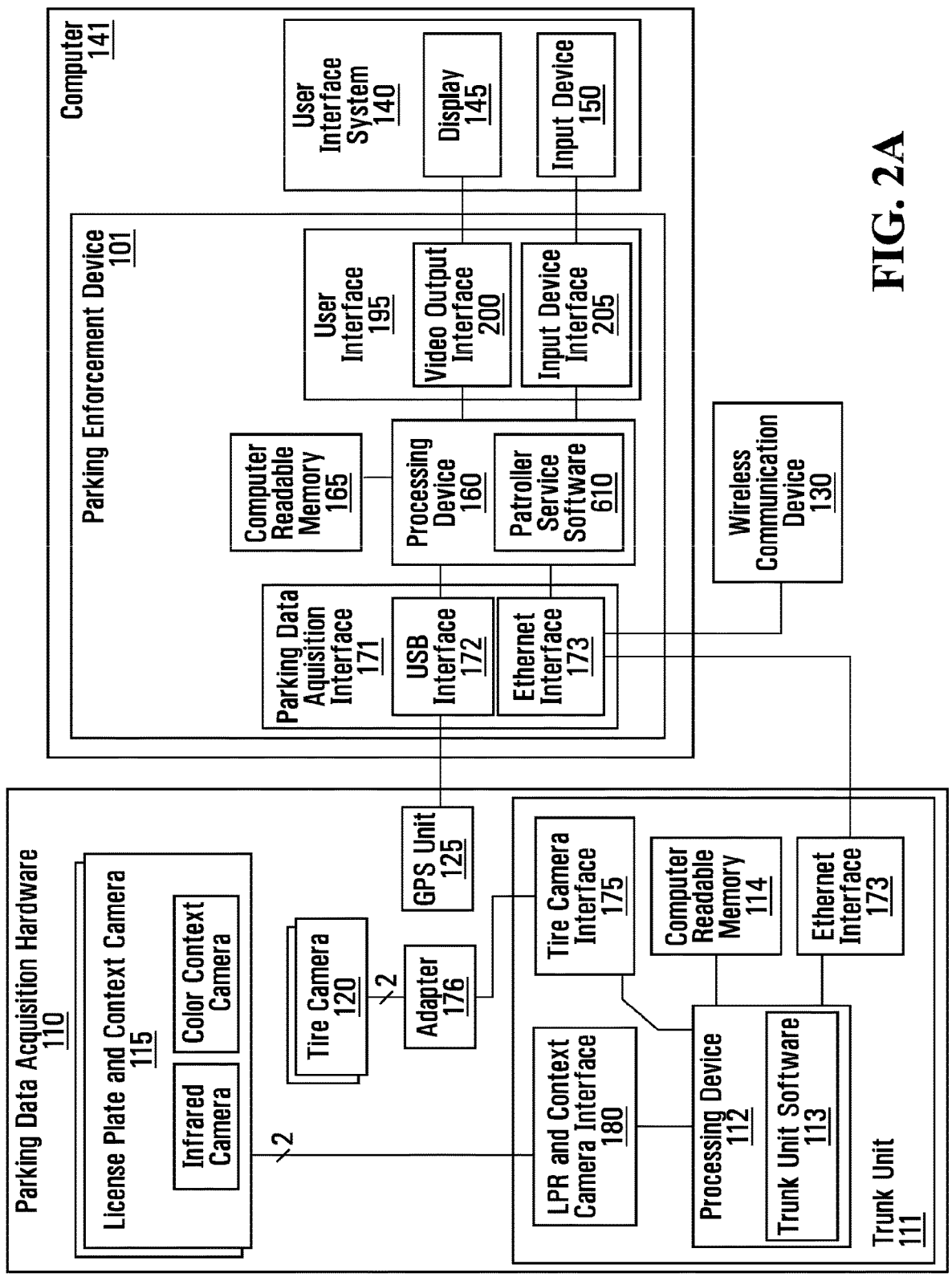
FIG. 2A is a block diagram of the parking enforcement system of FIG. 1.

FIG. 2A illustrates a block diagram of the parking enforcement system 100 according to a first embodiment. As shown the parking enforcement system 100 comprises a parking enforcement device 101 which comprises the processing logic, memory and interfaces for performing parking enforcement with the parking enforcement system. In the present example, the parking enforcement device 101 is embodied within the computer 141, which comprises the hardware and software of the parking enforcement device 101.

The parking enforcement device 101 of this example comprises a processing device 160, which is a general-purpose programmable processor, namely in this example an Intel® Core™ i5-4300U vPro™ Processor running the Windows® 10 operating system. The parking enforcement device 101 also comprises computer readable memory 165 in communication with the processing device 160, which stores program instructions and data used by the processing device 160.

The computer readable memory 165, though shown as a unitary module for simplicity may comprise several memory modules. In particular, it may comprise several layers of memory such as a hard-drive, external drive (e.g. SD card storage) or the like and a faster and smaller RAM module. The RAM module may store data and/or program code currently being, recently being or soon to be processed by the processing device as well as cache data and/or program code from a hard drive. A hard drive may store program code and be accessed to retrieve such code for execution by the processing device, and may be accessed by the processing device 160 to store parking data.

The parking enforcement device 101 comprises logic configured to perform the steps and interactions described herein. In this particular example, logic is provided by way of configuration of the processing device 160 by computer-readable program code stored in the computer-readable memory 165. The computer-readable program code implements a patroller service 610 in software as described herein. In FIG. 2A, the patroller service 610 software is shown within the processing device 160, although it is to be understood that in this embodiment, the program code storing the instructions for the processing device 160 to implement the software are stored in the computer-readable memory 165.

The parking enforcement device 101 also comprises a user interface 195 which communicates with the user interface system 140. The user interface 195 in this example comprises a video output interface 200 and an input device interface 205 for communicating with the display 145 and input device 150 respectively. In the present example, since the parking enforcement device 101 is implemented in the computer 141, the user interface 195 comprises elements of the computer 141 such as the graphic interface of the computer and the bus interface used by the keyboard. The video output interface 200 of this example comprises a video processing unit. In alternate examples, the display device may comprise a display that is driven by an HDMI input and is separately powered from the vehicle 105's battery with the video output interface 200 comprising an HDMI interface and port. The video output interface is in communication with the processing device 160 for receiving therefrom content to be displayed on the display 145. The video processing unit of the video output interface 200 may in certain embodiments share the use of some of the computer-readable memory 165 but in this example it has its own dedicated high-speed memory (not shown).

The input device interface 205 interfaces with the input device 150, in this example a keyboard. In embodiments where the input device 150 is an external device, such as an external keyboard, the input device interface 205 may comprise a USB connection for connecting with a USB keyboard. The input device interface 205 is in communication with the processing device 160 via a data bus to provide thereto input received from the input device 150.

The parking enforcement device 101 also comprises a parking data acquisition hardware interface 170 for communicating with the parking data acquisition hardware 110 and particularly for receiving parking data therefrom. In this example, the parking data acquisition hardware interface 170 may refer to the various data interface(s) used to receive parking-related data. In the example, parking data is received at the computer 141 over an Ethernet connection and the acquisition hardware interface 170 comprises the Ethernet interface 171 and the USB interface 172 when the GPS unit 125 is connected via USB, as is the case here.

The trunk unit 111 interfaces with the cameras, in this case two tire cameras 120, one on either side of the patrol vehicle 105, and two license plate and context cameras 115.

Figure 13:
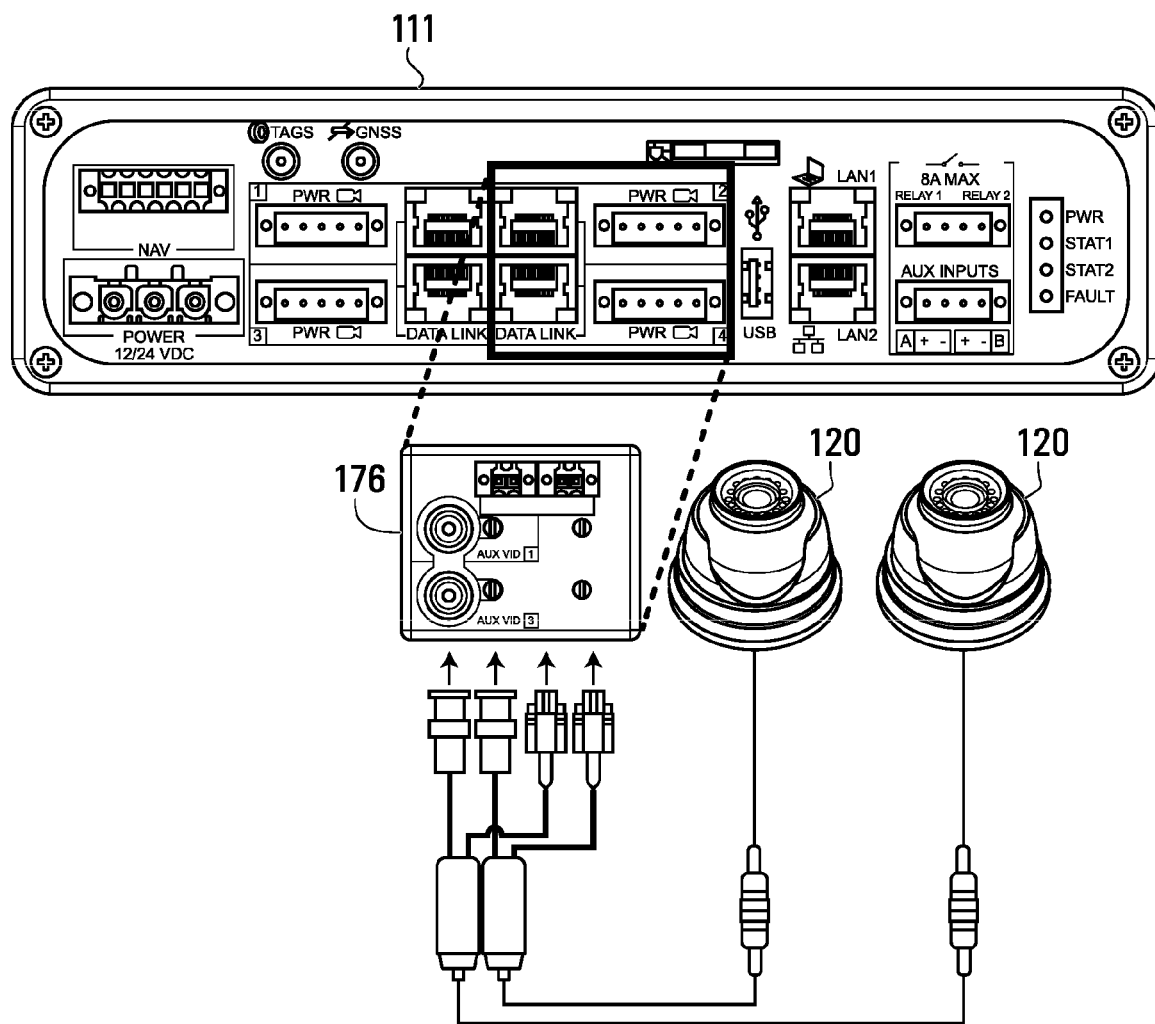
FIG. 13 illustrates a rear elevation view of the trunk unit of the parking enforcement system of FIG. 2 showing the connection to two tire cameras through an adapter.

FIG. 13 illustrates the connection ports of the trunk unit 111 in relation to two tire cameras 120. As shown, the tire cameras 120 are connected to the trunk unit 111 via an adapter 176 in this example because they have a different connector type than the RJ45 connector accepted by the trunk unit 111. The trunk unit 111 comprises a tire camera interface 175, which provides power to the tire cameras 120 and which receives image data therefrom. The trunk unit also comprises an LPR and context camera interface 180, which provides power to the LPR and context camera 115 and which receives image data therefrom. The trunk unit 111 has an RJ45 port for connecting with the cameras. Since the tire cameras 120 may be units that do not use the same connector, an adapter 176 is provided to suit the tire cameras 120's connectors. In this particular example the tire cameras 120 provide an analog signal over a coaxial signal. This is provided to the adapter 176 which comprises an analog-to-digital converter and the resulting digital signal is then provided to the tire camera interface 175.

The two camera interfaces are in communication with a processing device 112, which in this example comprises a general-purpose programmable processor running an operating system, in this example Windows® 7 embedded. The trunk unit 111 also comprises computer readable memory 114 in communication with the processing device 112, which stores program instructions and data used by the processing device 112.

The license plate and context camera interface 180 is configured to communicate with the license plate and context camera 115, specifically in this example to receive image data therefrom, but which may in alternate examples also provide communications thereto such as commands to scan or recognize a license plate. In this example, license plate recognition is performed by the processing device 112 based on images received at the license plate and context camera interface 180 and transmitted to the processing device 112 via a data bus. In other embodiments, the parking data acquisition hardware may comprise a standalone license plate reader (or other vehicle identifier detector) which identifies license plate numbers (or other vehicle identifiers, such as permits, RFID tags, etc. . . . ) and provides them via a suitable communication medium, e.g. a USB interface, to the parking data acquisition hardware interface 170. Returning to the present example, as mentioned the license plate and context camera 115 captures two types of images, monochrome and color images, by two separate capture devices, an infrared camera and a color camera. These may in some embodiments be provided together, e.g. in synched superframes containing both infrared and color images, however in this example the license plate and context camera 115 provides monochrome and color images as separate streams. These may be any suitable connections; in this example they are custom made cable connections that transport power to the camera and data therefrom. The license plate and context camera interface 180 comprises a bus interface which receive image data from the infrared and color cameras and transmits them via one or more data buses to the processing device 112.

The computer readable memory 114, though shown as a unitary module for simplicity may comprise several memory modules. In particular, it may comprise several layers of memory such as long term persistent storage (e.g. a hard-drive or external drive) or the like and a faster and smaller RAM module. The RAM module may store data and/or program code currently being, recently being or soon to be processed by the processing device as well as cache data and/or program code from a hard drive. The long term storage may store program code and be accessed to retrieve such code for execution by the processing device 112, and may be accessed by the processing device 112 to store data.

The trunk unit 111 comprises logic configured to receive camera data from the various cameras, perform image capturing, OCR, analytics, event generation (e.g. plate read) and to transmit event comprising or along with other parking or related data to the parking enforcement device 101 and more particularly to the patroller service 610 software running thereon. In this particular example, logic is provided by way of configuration of the processing device 112 by computer-readable program code stored in the computer-readable memory 114. The computer-readable program code implements a trunk unit software 113. In FIG. 2A, the trunk unit software 113 is shown within the processing device 112, although it is to be understood that in this embodiment, the program code storing the instructions for the processing device 112 to implement the software are stored in the computer-readable memory 114.

In order to communicate with the parking enforcement device 101, the trunk unit 111 comprises an Ethernet interface 173, which allows network communication with the computer 141.

The GPS interface 172 is configured to communicate with the GPS unit 125. In this particular example, the GPS unit 125 comprises a GPS antenna and a receiver which comprises GPS logic for receiving GPS signals and compute a location based thereon. The GPS unit 125 communicates with the GPS interface 172 via a suitable medium, here a USB connection, and transmits location information, here in the form of NMEA formatted positioning data, to the GPS interface 172. The GPS interface comprises a USB port and interface and communicates the received GPS to the patroller service 610 software running on the processing device 160. In alternate embodiments, the GPS logic for determining a location based on GPS signals may be provided within the parking enforcement device 101, for example within the GPS interface 172. In such a case, the GPS unit 125 may comprise the GPS antenna and the communication with the GPS interface 172 may be over a shielded connection that transmits directly the GPS signals as received. The GPS interface 172 would then comprise demodulation logic to interpret the received signals. While GPS is used in this example, it has already been mentioned that other types of location hardware may be used, such as dead reckoning systems. Other satellite-based or terrestrial antenna-based location systems may also be used.

The parking enforcement device 101 also comprises a wireless interface which communicates with the wireless communication device. Although shown as separate from the parking enforcement device 101, this and other units may be provided on-board or within the housing of the parking enforcement device 101. The wireless communication device of this example comprises a cellular network modem for communicating data wirelessly with a cellular network, particularly here using the LTE and/or 3G standard. The Ethernet interface 171 is in communication with the wireless communication device 130 and provides data to the wireless modem to transmit to a remote address, in this case over the internet, and receives data from the wireless modem. Thus in this example the Ethernet interface 171 serves as the wireless interface although in other examples a separate interface may be provided to communicate with the wireless communication device. The wireless communication device 130 provides internet connectivity to the connected components. Although in this example the wireless communication device 130 uses certain cellular data standards, other wireless communication standards, and other media such as satellite communication may be used in its stead or to complement it.

The wireless interface in this example takes the form of the Ethernet interface 171 which provides routing to and from the wireless communication device 130.

The illustrated example is exemplary only. It is conceivable, for example that using a particular system-on-a-chip, certain components shown separately be integrated with the processing device 160. For example, the processing device 160 may comprise software code modules for receiving, formatting, interpreting and/or storing data received from parking data acquisition hardware 110 or the user interface system 140 and may include an on-chip video processing unit.

Figure 2B:
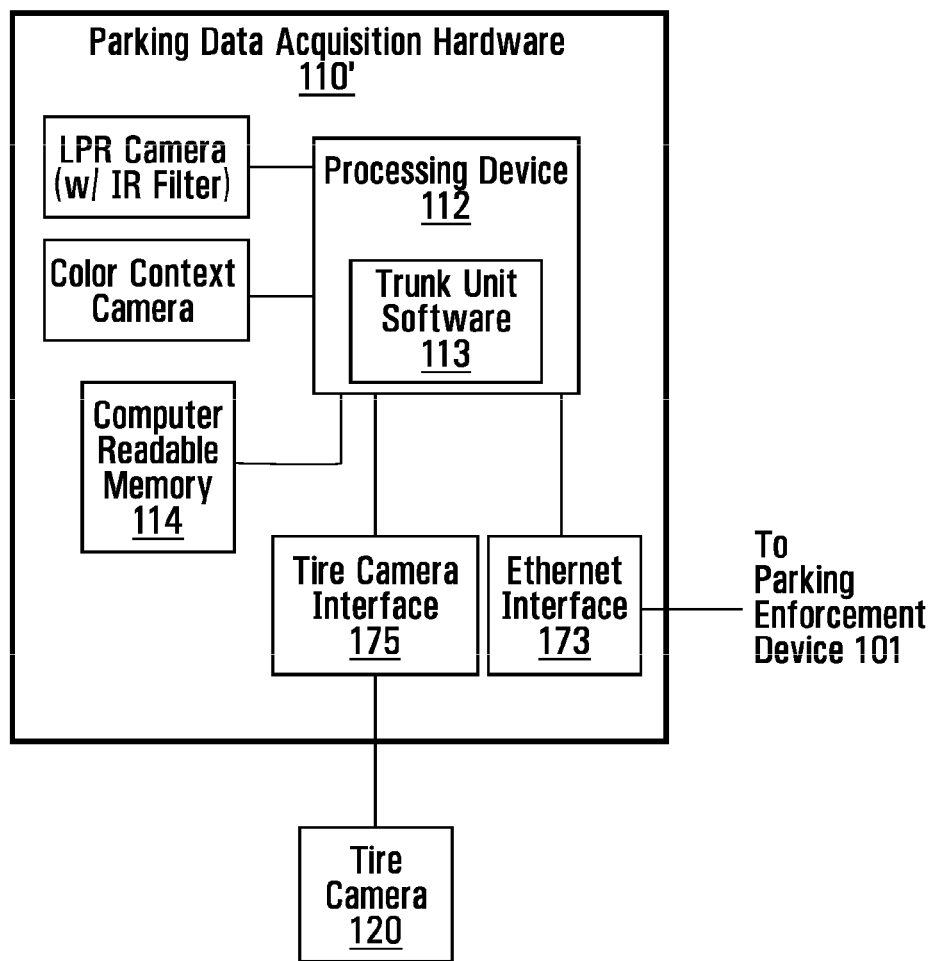
FIG. 2B is a block diagram of a variant of the parking data acquisition hardware in the parking enforcement system of FIG. 1, according to another example.

FIG. 2B illustrates a variant of the parking data acquisition hardware 110', whereby the parking data acquisition hardware 110' comprises a Sharp camera, which comprises much of the components of the trunk unit 111 of FIG. 2A, including the processing device 112 implementing the trunk unit software 113, the computer readable memory 114, the tire camera interface 175 and the Ethernet interface 173.

Figure 2C:
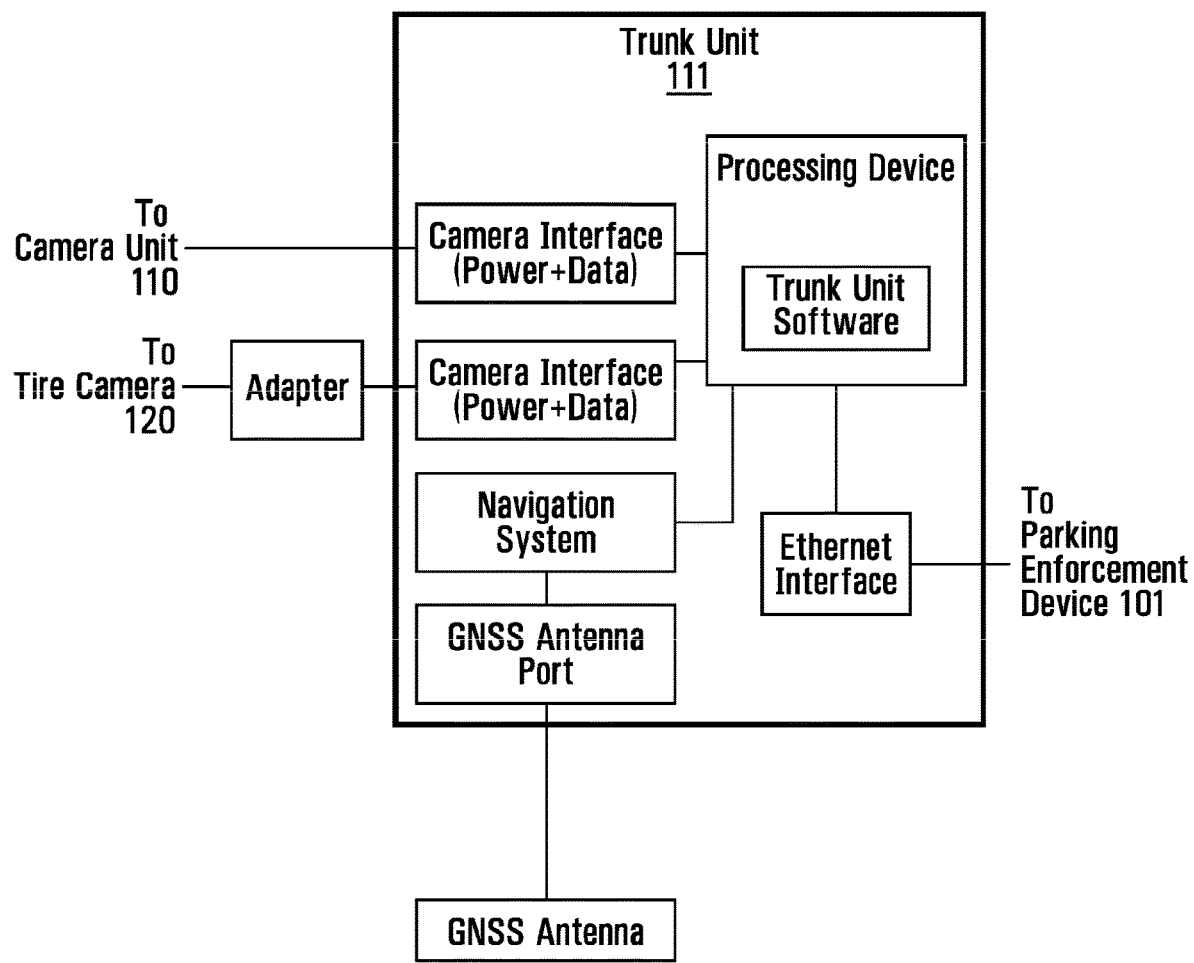
FIG. 2C is a block diagram of a variant of the trunk unit in the parking enforcement system of FIG. 1, according to another example.

FIG. 2C illustrates a variant of the trunk unit 111 of FIG. 2A, the trunk unit 111', whereby the trunk unit 111' comprises a navigation system which includes the position computing functions of the GPS unit 125. The navigation system is connected to a GPS antenna via an antenna port and shielded cable. In this embodiment, the trunk unit 111' introduces positional information into plate read events. The trunk unit 111' may also be configured to provide position information upon request from the parking enforcement device 101.

Figure 4A:
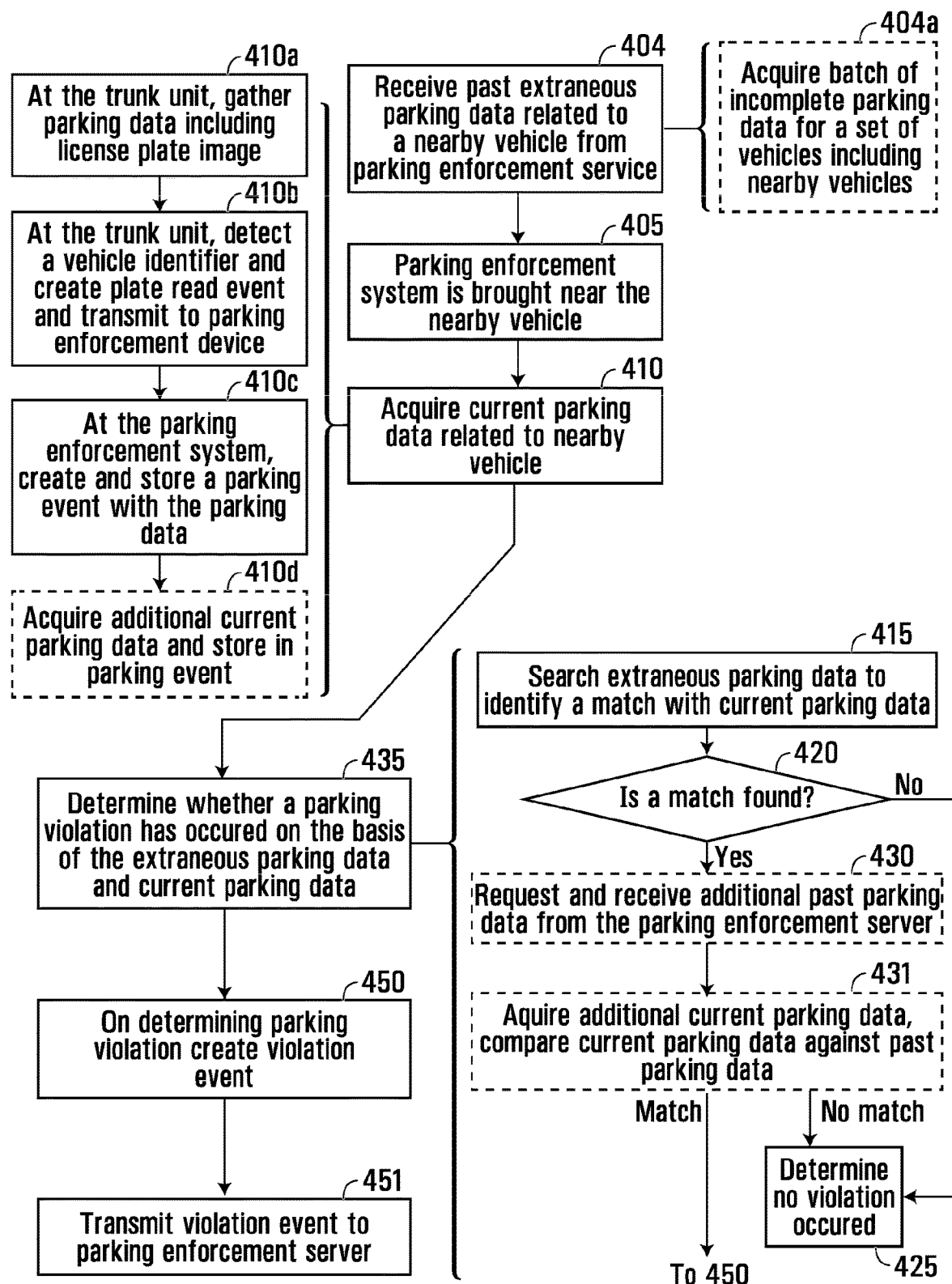
FIG. 4A is a flow chart describing parking enforcement performed by the parking enforcement system of FIG. 1 according to a particular example.

FIG. 3 illustrates the patrol vehicle 105 performing parking enforcement. FIG. 4A shows a flow chart of an exemplary parking enforcement method implemented. At step 404 extraneous past parking data related to a nearby vehicle is received from a remote server. In the present example, extraneous past parking data, which has been gathered by another patrol vehicle in the past, is received in batch, for example based on the location of the patrol vehicle 105, e.g. based on the penetrating of a geo-fenced area by the patrol vehicle 105. This extraneous past parking data is received from a parking management server 605 over wireless communication using a cellular communication network. Transmission of the extraneous past parking data from the parking management server 605 to the patrol vehicle 105 is described in more details here. In the present embodiment, the extraneous past parking data is received in a batch, such that the extraneous past parking data for multiple past parking events, e.g. all past parking events in the last X hours for a particular parking zone, are downloaded at step 404a.

In this example, the batch download comprises only partial parking data (in this case, license plate/vehicle ID, timestamp, geographical information, parking zone) are downloaded for a group of parking events. This allows the parking enforcement system 100 to have the data required to ascertain whether there is a match between a currently parked vehicle (as described in current parking data acquired by the parking enforcement system) and a past parking event. However, additional parking data, such as context images, tires images and the like may be omitted from the batch-downloaded parking data in order to reduce bandwidth and storage requirements and for other reasons. These details can be downloaded later upon request as described herein.

By downloading batch data and storing it in local, quickly-accessible storage, the parking enforcement system 100 is able to perform quick lookups for rapid match determinations. This is advantageous; for example, the patrol vehicle 105 may scan license plates as it drives by parked vehicles (as shown in FIG. 3) and rapidly upon scanning a license plate, look up the vehicle license plate in the received extraneous past parking data to see if there is a match. This rapid match determination allows for certain conveniences. For example, it may enable the parking enforcement system 100 to determine parking violations quickly before the patrol vehicle 105 has moved past the parked vehicle in question such that a parking ticket can be issued without requiring the patrol vehicle 105 to stop and back up.

In alternative embodiments, downloading extraneous past parking data may be performed later, and with a specific request for the data. To that end the parking enforcement system may transmit to the parking management server 605 a request, e.g. in the manner described herein for batch data, for extraneous past parking data upon acquisition of current parking data with the parking data acquisition hardware 110. This request may comprise some of the current parking data, e.g. a license plate number/vehicle identifier, such that the parking enforcement server 605 may search for specifically past parking data pertaining to that particular vehicle identifier, and optionally to particular parking rules (e.g. outside of the allowable time period) and transmit to the parking enforcement system 100 extraneous past parking data relating specifically to the parked vehicle, or if none is found, an indication to that effect. In such a case the step 404 may be located lower in the flow chart of FIG. 4A, after step 410. Indeed, the ordering of the steps in the flow chart is exemplary as the order certain steps may be modified in certain variants. In the present embodiment, however, the illustrated example using batch downloads is preferred.

As, shown, and in step 405, the patrol vehicle 105 approaches a parked vehicle, here a first parked car 305, and the patrol vehicle 105 brings the parking enforcement system 100 nearby the first parked car 305.

With the parked car 305 nearby, the parking data acquisition hardware 110 acquires parking data pertaining to the first parked car 305 at step 410. In this example, the parking acquisition hardware 110, including the GPS unit 130, license plate and context camera 115 and tire camera 120 can operate rapidly in real time and this operation can take place even as the patrol vehicle 105 is still moving.

During data acquisition, an infrared camera in the license plate and context camera 115 captures images of the parked car 305's license plate. This may be prompted from user input. In one example, the parking enforcement device is constantly receiving the output of the data acquisition hardware 110 or part thereof and provides a user with output based on the received input. For example, the color camera of the license plate and context camera 115 may be continuously capturing images. A user using the computer 141 may view the feed from the license plate and context camera 115, either by accessing a web portal of the trunk unit 111, if one is provided, over the Ethernet connection, or the patroller service 610 may connect to the trunk unit 111 and retransmit the monochrome or color camera feed.

In the present example, the parking data acquisition hardware is constantly working while enabled, with the license plate and context camera 115 providing the trunk unit 111 images, some of which will eventually comprise a license plate image. This occurs at step 410a. The trunk unit 111 performs license plate detection on the monochrome video data and when a license plate is read, at step 410*b*, it triggers a plate read event, and transmits the license plate data, along with other parking data as described, to the parking enforcement device 101. This particular architecture, with the trunk unit 111 performing plate reads and creating plate read events and transmitting them to the parking enforcement device 101 is exemplary and the reader should appreciate that the trunk unit 111 and parking enforcement device 101 may be merged in alternate embodiments. Optionally other/different data may be provided with the plate read event. Optionally this process may also be manual; when the user sees that the first parked car 305 is nearby, in range of the parking data acquisition hardware 110, and/or that the parked car 305's license plate is in view, the user may provide an input on the input device 150 requesting a license plate read or other parking data acquisition. The input device interface 205 receives, this input and transmits it to the processing device 160, where program code interprets the input as the instruction and in response engages parking data acquisition by running corresponding program code modules. In some embodiments, manual triggering of plate acquisition may be used, for example, when the system fails to automatically read a license plate.

Thus the processing device 112 engages license plate recognition at step 410*b*. In this example, the infrared camera is constantly transmitting monochrome images to the trunk unit 111. This signal is processed by the embedded trunk unit software 113 and only valid license plate read events are sent to the parking enforcement device 101. License plate recognition is engaged by executing at the processing device 112 program code instructing the processing device 112 to process the current infrared image or images to detect a license plate number. Any suitable license plate reading algorithm may be used, which may be performed using one or more license plate image. In this particular example, the processing device 112 executes a license plate recognition module, which in this example is a program code module, that performs a license plate recognition algorithm to extract the image-space location (specifically here, pixel coordinates) of the license plate. The image feature identification module performs an extraction of a license plate region, a segmentation and recognition of the license plate features, in this case license plate characters. The processing device 112 accesses the image space location of the license plate in the images to obtain the portion of the images featuring the license plate. The processing device 112 may then execute under instructions by the license plate recognition module a de-rotation and de-skewing algorithmic logic which it applies to the license plate image in order to generate a plate image that is a flat (horizontal) rectangle. The license plate recognition module may comprise algorithmic logic (in this case program code instructions) to calculate the sum of the image intensity (Y value) columns of the image and applies it to generate an image intensity profile. The license plate reading recognition module outputs a value for the license plate.

The system is able to deal with errors in plate reads, errors/inaccuracies in GPS positioning as well as minor relocations of the parked-vehicles. Plate read errors include character additions, deletions and substitutions. This allows compensation for imperfect license plate reads. In order to match two plate reads at times T1 and T2, several factors are accounted for including The number of optically equivalent characters in the sets of characters of each read. For example, ABC123 resembles A8C123 since B and 8 are optically similar; and The Levenshtein distance between the two sets of characters. For example, the Levenshtein distance between ABC123 and ABC124 is 1.

The number of optically equivalent characters and the Levenshtein distance permitted vary as a function of the length of the character set. In one example AB122 is a five character set and a match may only have 1 optical equivalent and a Levenshtein distance of 1. A 4 character set match may only have a maximum of 0 optical equivalents and a Levenshtein distance of 0. The objective may be to find the most likely match(es) with few or no false positive.

Thus the license plate recognition module is a vehicle identifier detection module as it determines a license plate number as a vehicle identifier for the parked car 305. In alternate embodiments, the vehicle identifier detection module may perform a different vehicle identifier detection algorithm. For example, it may command external hardware, e.g. an RFID reader, to scan for and/or provide an RFID code. Alternatively, where the vehicle identifier is a permit number, the module may perform an optical recognition algorithm on the color (or infrared) image of a parking permit. The license plate recognition module may also be applied to color images although infrared images are preferred as they have been found to present a clearer image of license plates in more conditions, and in this example have higher resolution. The license plate and context camera 115 comprises infrared light sources to provide even better conditions for license plate recognition.

In addition to recognizing a vehicle identifier, the license plate recognition module may cause the storing in computer-readable memory of license plate image(s) used in the license plate identification as context data.

At the parking enforcement device 101, upon receiving a plate read event, a parking event is created storing therein parking data provided with the plate read event, at step 410*c*. In response to the parking data acquisition, the processing device 160 stores context data pertaining to the parked vehicle 305, in this example, one or more color images of the parked vehicle 305. This may be performed simultaneously or in any order relative to the license plate recognition. This context data may be useful in proving guilt when a parking violation is contested.

In the above example, parking data acquisition was automatic. Particularly, the license plate and context camera 115 is continuously capturing images for the detection of license plates, e.g. monochrome images from the infrared camera, which are received at the parking data acquisition hardware 110 and analyzed for license plate detection as described. To this end, the trunk unit 111 or parking data acquisition hardware 110' repeatedly runs the license plate recognition module (or more broadly, vehicle identifier detection module) to detect a license plate. Every time a new license plate is detected, the remainder of the process is engaged, including storage of context data. Alternatively, plate reading may comprise a user prompt for a plate read. However, the user may optionally have the option to enable or disable the license plate reading by providing input at the input device which is received and interpreted at the processing device 160 which in response enables or disables license plate reading. In this embodiment where license plate detection is performed outside of the computer 141, this may involve sending an instruction from the computer 141 to disable plate reading to the trunk unit 111, but more simply may just involve setting the parking enforcement device 101 to ignore plate read events. Thus a parking enforcement agent driving the patrol vehicle 105 may engage the system only when driving by parked vehicles.

The parking data acquisition hardware 110 (in this example the trunk unit 111) gathers parking data and generates a plate read event containing information related to the plate read. In this context, this data comprises a timestamp, the license plate number and additional analytics such as the plate state/jurisdiction, a read confidence score, a vehicle make and mode, a relative speed, etc. The parking data acquisition hardware 110 may also include in or with the plate read event image data, such as a context image and a plate image. To this end, the trunk unit software 113 comprises a parking event creation module, here in the form of program code which may be stored in computer-readable memory 114, to create a plate read event. This may be prompted by user input, however in this example, the processing device 112 engages the read event creation module in response to detecting a vehicle identifier, specifically here a license plate.

The plate read event is then transferred to the parking enforcement device 101 still at step 410*b*. In alternate embodiments, the trunk unit 111 and parking enforcement device 101 functionalities may be merged onto a single device, e.g. a computer running both the trunk unit software 113 and the patroller service 610 software, or the functionality of both could be combined into a single software. In such cases, the plate read event may be transferred via inter-process or inter-thread communication. At step 410*c*, the parking enforcement device 101 stores data from the plate read event.

The patroller service 610 software comprises a parking event creation module, here in the form of program code which may be stored in computer-readable memory 165, to create a parking event. The parking event typically comprises the parking data from the plate read event, although some data may be omitted, if unnecessary.

In certain embodiments, for example where the parking enforcement system 100 is being used to monitor infractions for overtime parking violations, it may be necessary to acquire additional parking data such as tire images, e.g. to compare to a past parking event showing that a vehicle has not moved since the past parking event. To that end, at step 410*d*, the parking enforcement device 101 may supplement the parking event with additional parking data, such as tire images acquired from the trunk unit 111. This may be prompted by user input, however in this example, the processing device 160 engages the read event creation module in response to detecting a vehicle identifier, specifically here a license plate.

Figure 5:
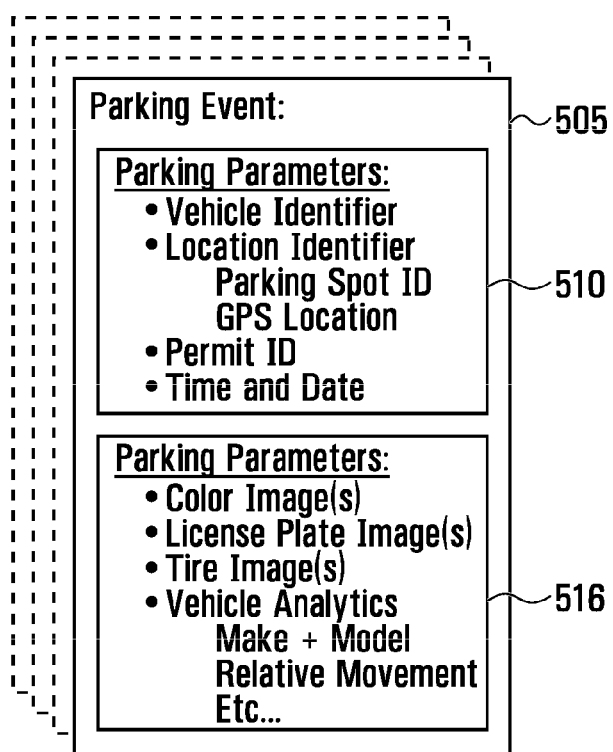
FIG. 5 is a block diagram of a parking event object created by the parking enforcement system of FIG. 1 according to a particular example.

A parking event in this example is a grouping of data, for example a data structure, comprising data pertaining to an observed parked vehicle at a particular time. Its contents may be adapted to the type of parking regulations being enforced. In this example, the parking enforcement system is used to enforce parking violations such as overtime violation, permit violation and permit sharing. FIG. 5 illustrates the contents of an exemplary parking event 505.

As shown, the parking event comprises data categorized into two types: parking parameter 510 and context data 516. The parking parameters in this example include the vehicle identifier, here the license plate data, location identifier(s), and may also comprise one or more permit IDs associated with the parked car 305.

In this particular example, the location identifier is a GPS location as determined by the GPS unit 125. The processing device 160 of this example comprises a location calculation module that computes the location of the parked vehicle 305 on the basis of the location found by the GPS unit 125, e.g. by applying an offset to account for the distance between the GPS unit 125 and the parked vehicle 305 on the basis of the side of the vehicle 105 on which it was detected. In this example, the GPS data is stored as a field in the parking parameters object, however in other examples it may be associated with another form of data, e.g. as metadata to an image file or vehicle identifier object.

The system is able to deal with inaccuracies in GPS positions, as the urban-canyons that tall buildings create in city centers often obscure the GPS satellites and add significant noise to the positioning information. To improve the positioning accuracy, —some or all the dead reckoning information available can be used: odometer information, gyroscopic information and patrol-vehicle wheel rotation information.

Another source of variance that may complicate all the matching is minor relocations of the parked-vehicles. Sometimes the move of the parked-vehicle is legitimate (parked-vehicle departed and returned to a parking position close or identical to the original position). Sometimes the move is a countermeasure for the chalking and to get around the time-limited parking regulations. Both of these types of movements complicate the reconciliation of the two patrol-vehicles reads of the parked-vehicles. For example, moves may change the order in which the plates are read by each of the patrol-vehicles.

The exemplary algorithms provided herein may use various statistical techniques to detect a probable violation of the time-limited parking regulations. The techniques used may be jurisdiction dependent, thus they may not all be used together. A rules engine may be defined and adapted to a particular jurisdiction to detect violations.

In other embodiments, the parking enforcement system may comprise a parking spot detector which detects a particular parting location by parking spot ID, e.g. by visual recognition of a parking spot label or by RFID reading. The parking device may accordingly be provided with a parking sport detector interface to communicate with the parking spot detector and receive parking spot data therefrom.

The parking enforcement device 101 has access to a permit list which are pre-defined permits associated with parking rights. Typically, each parking permit is associated with one or more vehicle identifier such as license plate number. This data is usually contained within a permit list which is downloaded by the parking enforcement system 100, either through the wireless communication device or from the parking enforcement server 605 or provided thereto via a physical connection, e.g. uploaded from a USB key. Each permit is typically associated with a geographical area, and may be defined by a geo-fence. In the present embodiment, permit lists are separated by geographical areas/geo-fences such that a list contains all permits applicable to the geographical area. For example, if a business has multiple campuses, each with different permits, there may be different permit lists for each campus and when the patrol vehicle 105 enters the geo-fenced area of one campus, the patroller service 610 downloads or activates the corresponding list. In the present embodiment, the patroller service 610 software may download or activate a permit list based on GPS location of the patroller vehicle 105. When plate reads are performed within the geographical area, plate read events are matched against permits corresponding to the permit list for that area. Alternatively, the permits may be stored and kept active altogether, with the patroller service 610 matching plate read events against permits and permits against the geographical area. In alternate embodiments, permit data may be obtained by other means, e.g. by detecting a permit from the patrol vehicle using an appropriate permit detection technology.

In the parking enforcement system, the permit list is selected (i.e. active) based on the patrol area and the received read event is checked against this list. When a match is found between a vehicle ID and an entry in the permit list, the permit ID may be determined. For example, a permit list where ABC132 is allowed to park in zone A until the end of the month. This record is identified as permit ID 123456. If the enforcement vehicle reads DEF456 (not in the list), while the previously mentioned permit list is active, the system does not determine the permit ID and a permit HIT is raised, indicating that the vehicle has no permit. If the system reads ABC123, this plate can be found in the permit list and its permit ID is determined to be 123456.

Permits may include shared permits where a permit may be shared among multiple different vehicles. In some cases, people may purchase one permit for parking but have multiple vehicles. In order to allow the purchaser to use either one of their vehicles, the permit may be shared amongst the two vehicles. In general, shared permits are subject to constraints, e.g. only one vehicle may benefit from the parking permit at a time, or within a particular time range (e.g. a day). That way if a person purchases one permit and shares it amongst their two vehicles, they may use one vehicle or another on any given day, but if both are found parked in the permit parking lot/zone on the same day, a violation has occurred. For the sake of simplicity, this example will be used when referring to shared permits: a permit that is associated with two vehicle identifiers, where only one of the two corresponding vehicles may be used in any given day to park in the permitted zone. The reader should understand that more complicated sets of rules related to permits may exist, but generally shared permits will be shared amongst plural vehicles while being subject to one or more constraint. Shared permit enforcement involves verifying that the constraints are respected.

Likewise parking events stored by the parking management server 605 may be associated with geographic areas or other constraints, such that when the patrol vehicle 105 meets a constraint, the parking data associated with that constraint are transmitted to the parking enforcement system 100. In one particular embodiment, each of the parking events are associated with a parking zone, which in turn is associated with a geographical area, e.g. a geo-fence. The parking enforcement system 100, may transmit the location of the patrol vehicle 105 to the parking management server 605, e.g. constantly or when the patrol vehicle changes zones. When the parking management server 605 determines that the patrol vehicle 105 has entered the geographical area associated with a particular zone (or alternatively when the parking enforcement requests the transmission of past extraneous parking data associated with that zone—if for example the parking enforcement system 100 self-locates itself within certain zones), the parking enforcement server 605 identifies the relevant past parking events in that zone and transmits them, e.g. in redacted form as in step 404a, to the parking enforcement system 100. Relevant past parking events may be all past parking events in that zone, but typically comprises at least one additional criterion, such as within a certain timeframe (e.g. past 48 hours, or from the last patrol).

The parking parameters also comprise time and date data, which in this example is received from the GPS unit 125 and stored as a field in the parking parameters object. In other embodiments, there may be another time source. For example, the computer 141 may provide the time source and other devices such as the trunk unit 111 may synchronize with the computer 141's time.

The parking event may also comprise other data such as data identifying the patrol vehicle 105, a user or agent using the parking enforcement system 100, and other data. When the parking enforcement system 100 is used to enforce parking time limits, it may be useful to gather context data that can prove that a parked vehicle has not moved in a given time period. In the past, parking enforcement officers would chalk mark tires at a particular location. When they returned after expiration of the time limit, vehicles with chalk marks in the same location would be found to have not moved as indeed it is particularly unlikely that a vehicle parks twice in a same location with the wheels in the identical orientation. The parking enforcement system 100 is configured to take pictures of vehicle tires where a distinguishing feature, e.g. the valve stem, may likewise be used to ascertain whether the vehicle has been moved between readings. While in this example, we talk about tires, this technology is not necessarily limited to pneumatic tires and may be applied more broadly to wheels or other similar structures.

Figure 4B:
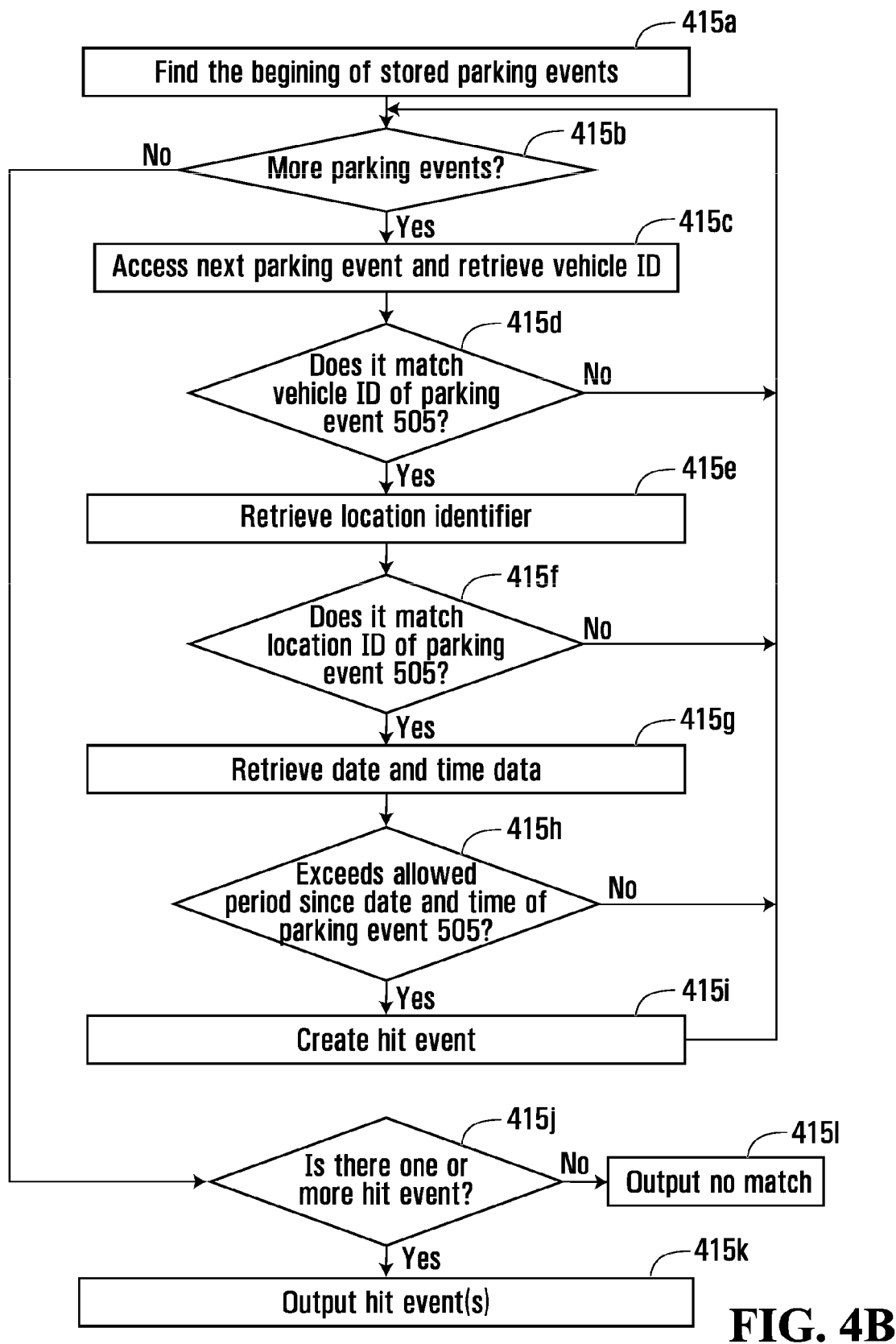
FIG. 4B is a flow chart describing parking data acquisition by the parking enforcement system of FIG. 1 according to a particular example.

Returning to the example of FIG. 3 and FIGS. 4A, 4B, once license plate recognition 410b is complete and the license plate recognition returns license plate data (e.g. number, and optionally a province or state or territory or country), the processing device 160 causes the display 145 to display a note to the user showing the license plate number. In our particular example, this is prompted by the reception at the parking enforcement device 101 of a plate read event. This is useful, for example, where license plate reading is automatic as it allows the user to detect if a license plate is passed by without being read. Optionally, an audible cue may be output at an audio output device which may be provided, along with a suitable interface, in the parking enforcement system 100. Optionally, user input can flag an incorrect reading to cause the re-execution of the license plate recognition or correct the license plate read by manually typing in the correct characters.

In certain embodiments, additional current parking data may be required to store as evidence or to determine a parking violation has occurred. Such additional parking data may include (more) context images or tire images. This is captured at step 410d, which may be performed optionally at each parking event (as a substep of step 410) or only when a current parking event matches past extraneous parking data (as a substep of step 435).

Such as when overtime parking detection is being monitored, upon license plate recognition 410b (though in alternate examples, this may be prompted by other events, such as receiving the user input requesting parking data acquisition), the tire camera 120 begins to capture images of the parked vehicle 305's tires as the patrol vehicle 105 is nearby. In this example, the tire image capture is triggered by a license plate detection. For this reason, the tire camera(s) 120 may be mounted near the rear of the patrol vehicle 105 such that the license plate can be read first, followed by the tire imaging as the patrol vehicle 105 drives past the parked vehicle. In this case while it passes it by. To that end, the processing device 160 executes a tire image acquisition module at step 410d, which receives data from the tire camera 120 (which in this example continuously provides it but which alternatively could also be initiated by the tire image acquisition module).

In this particular example, the parking enforcement device 101 receives a stream of images over a predetermined displacement of the vehicle and keeps 1 frame for every particular distance (e.g. 30 cm) of displacement. Not shown FIG. 2 is an odometry system which provides travel distance information, such that the patroller service 610 software knows when the vehicle has moved a certain distance. Alternatively, time or GPS distance may be used, although GPS may not be accurate enough for fine distance measurements. In this example, the pre-defined typical vehicle length is set to 9 meters and the system captures a total of approximately 30 images.

When there is an overtime hit, the operator is presented with two sets of 30 images and must pick the best one which show only the wheel, since some images may show the back and front bumper or just the side of the car. Based on received user input the processing device 160 executing the tire image acquisition module program code selects the corresponding tire images to store as context data. The operator may then compare the tire images from the two sets and provide input at input device 150 indicating whether a match is found. In alternate embodiments, this comparison may be automated if suitable algorithms are known.

With the parking data thus collected, the processing device 160 adds the additional parking data, if obtained at step 410d, to the parking event created at step 410c. Alternatively, the creation of the parking event may be delayed until after all parking data is collected, including additional parking data from step 410d. In this particular example, the parking event is a data object comprising data and files. In particular, in this example the parking event is a C# object that comprises fields containing vehicle identification data, time and date data, and GPS data. Files include color images, license plate images and tire images. In this particular example the files are linked by reference to the parking event.

Having completed the read event, the parking enforcement system 100 may then be moved to another vehicle, e.g. next vehicle 310 to complete another read event. However, several other steps may take place at this point as well.

Figure 6:
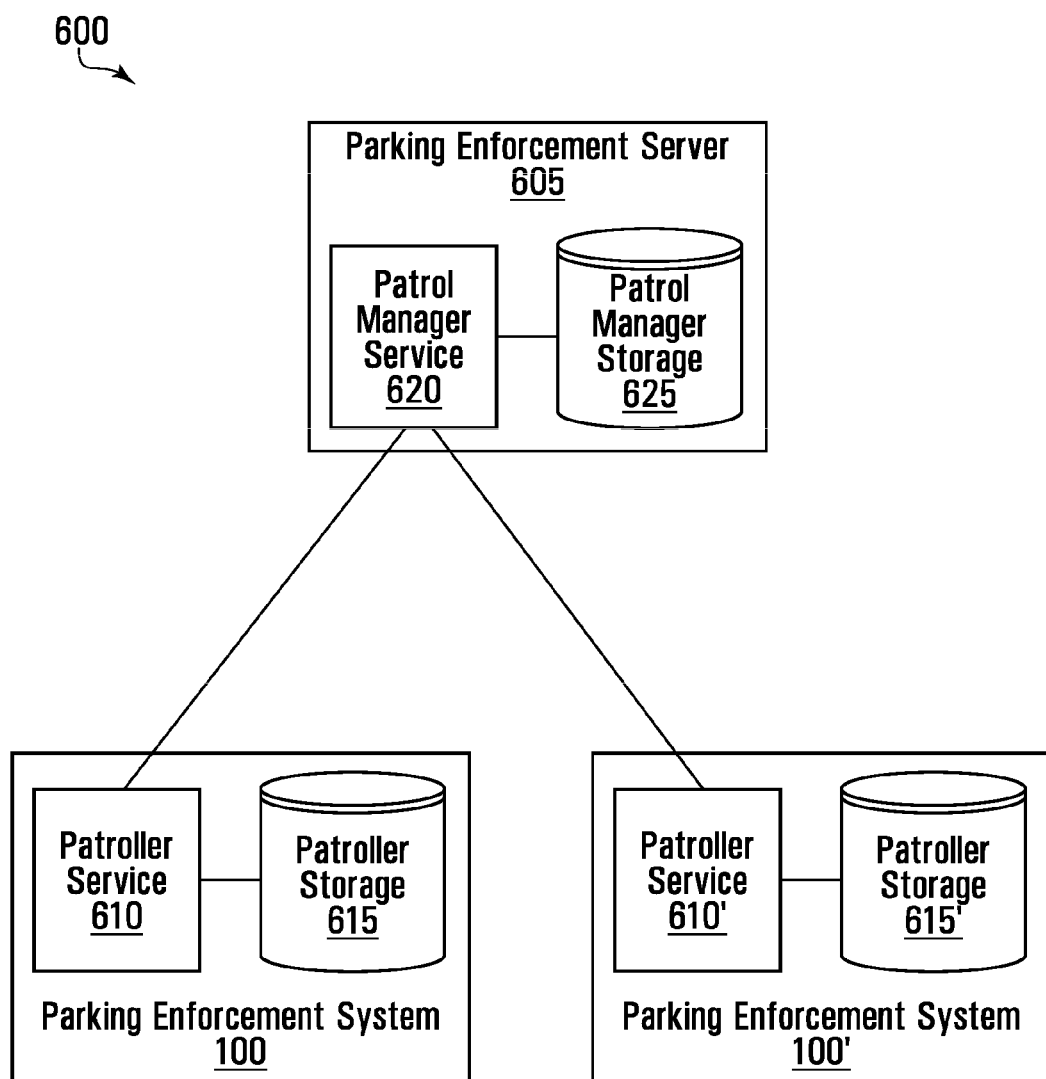
FIG. 6 is a block diagram of a parking management system according to a particular example.

In particular, the processing device 101 transmits the parking event 505 to a parking enforcement server. FIG. 6 is a block diagram of a parking management system 600. The parking management system comprises a parking enforcement server 605 which is in wireless communication with the mobile parking enforcement system 100 as well as other mobile parking enforcement systems in other locations such as the second parking enforcement system 100'. Here the system is illustrated in terms of logic components. The parking enforcement system 100, which may be the same system as described above, comprises patroller services 610, which is the logic implementing the parking enforcement services described herein, implemented in this example by program code running on processing device 160. The parking enforcement system also comprises patroller storage 615 which is the logical data accessible by the patroller services, including the parking events stored by the processing device 160 in the computer-readable memory 165.

The parking enforcement server 605 comprises a patrol manager service 620 and patrol manager storage 625. The parking enforcement server is in communication with the patroller service 610 and other such services like second patroller service 610' in the second parking enforcement system 100' in another patrol vehicle. To that end, the parking enforcement server comprises a data interface for communicating with patroller services. Conveniently in the present example, since the parking enforcement systems are provided with wireless internet connection, communication with these systems may be achieved via an internet connection to which end the parking enforcement server 605 is provided with a network interface.

The patrol manager service 620 comprises logic effecting patrol management operations as described herein. In this example, the patrol manager service 620 is implemented by software running on a server machine. In particular, the patrol manager service 620 may be a program module provided within the context of a larger security management program such as Security Center by Genetec Inc.

The patrol manager storage 625 comprises parking data received from parking enforcement system 100 and other such systems like the second parking enforcement system 100' provided on another patrol vehicle. The patrol manager service 620 has read and write access to the patrol manager storage 625 and manages a database of parking data, which in this example is stored by way of an SQL database. The patrol manager is configured, in this example by program code instructions, to create entries in the database to store parking data received from the patroller services and to retrieve entries previously stored to provide to patroller services.

Figure 7:
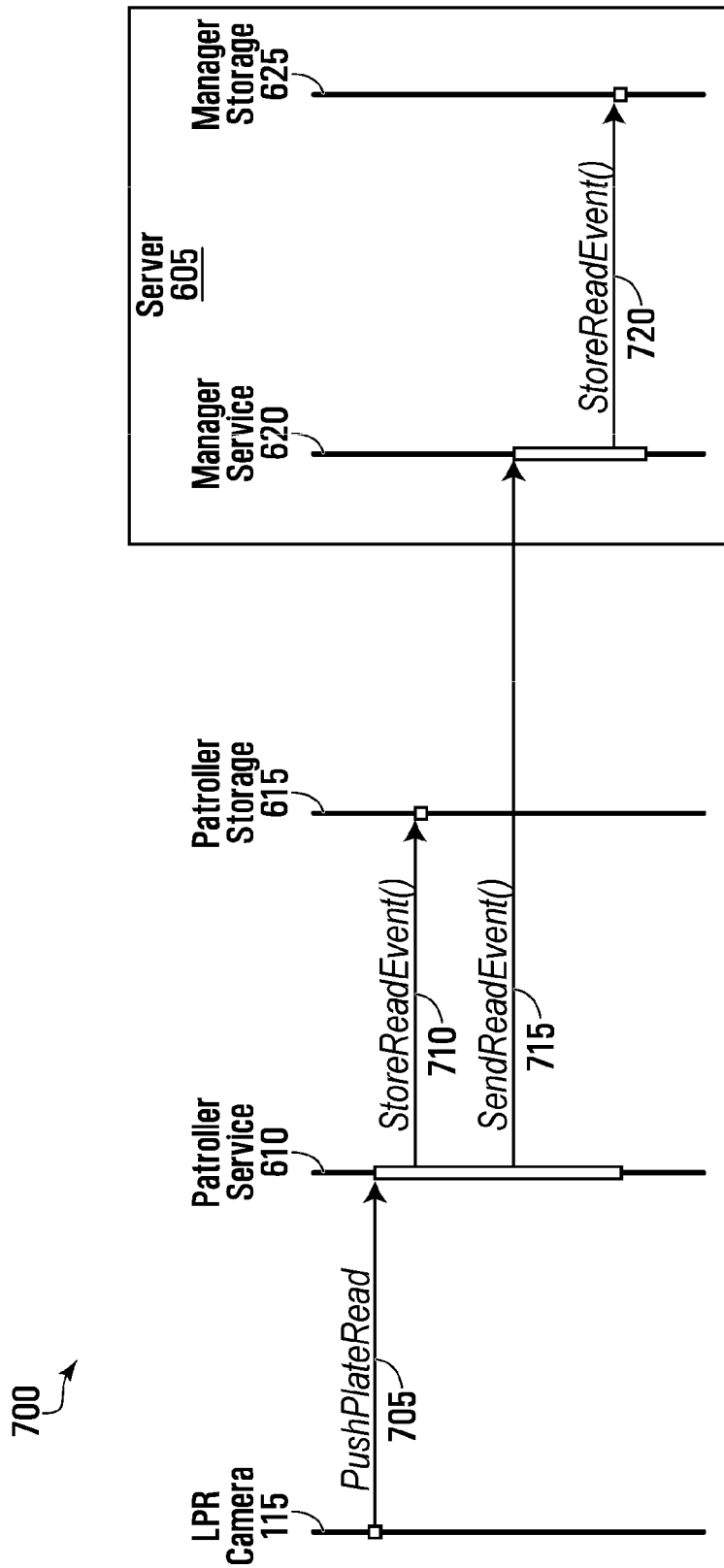
FIG. 7 is an event flow diagram describing transmission of parking data from the parking enforcement system of FIG. 1 to a parking enforcement server according to a particular example.

FIG. 7 is an event flow diagram illustrating the transfer of parking data from the parking enforcement system 100, and more particularly from the parking enforcement device 101 to the parking enforcement server 605.

In the example illustrated here, the trunk unit 111 automatically detects license plate numbers in a continuous process. When a license plate is detected, trunk unit 111 pushes a plate read 705 to the parking enforcement device 101 in an electronic message comprising the license plate data. This is received at the parking enforcement device 101 through the license plate and context camera interface 180 and the data is transmitted to the processing device 160. Alternatively, the plate read 705 may be generated within the processing device 160 by a logic module, in this example a program code module that analyzes the output of the license plate and context camera 115 and identifies license plate, e.g. using the algorithm described above.

Upon receiving the plate read 705, the patroller service 610 creates a parking event in a suitable manner such as the manner described herein. The parking event is stored in the patroller storage 615, which in this example is implemented in computer-readable memory 165.

However, alongside storing the parking event locally, the parking enforcement system 100 and more particularly the parking enforcement device 101 also sends 715 parking data from the parking event to the parking enforcement server using the wireless interface 190 and the wireless communication device 130. To this end, the parking enforcement system 100 establishes an internet connection using the wireless communication device 130. The parking enforcement system 100, specifically here the parking enforcement device 101, retrieves from memory the parking data to be transmitted and converts it in this example to a format suitable for transmission and/or processing at the parking enforcement server 605. In this example the transmission is a network transmission over a data network, specifically here the internet. Accordingly, the parking enforcement system 100, and more particularly the parking enforcement device 101, serializes and packetizes the parking data and addresses it to a network address (e.g. IP address) associated with the parking enforcement server 605. The parking data is transmitted wirelessly by the network communication device 130 using a networking protocol.

In this example the entire contents of the parking event 505 are transmitted to the parking enforcement server 605, including parking parameters 510 and context data 516.

However, in alternate only a subset of the parking data in the parking event 505 may be sent, such as just the parking parameters 510. Transfer of data to the parking enforcement server 605 may be split, some of it being transmitted at different times, however in this example entire parking events are transmitted in one go. Also, additional data to the parking data may be transmitted therewith. For example, a user ID or system ID, the ID of a user, the ID of the system, etc. may also be transmitted with the parking event 505.

In the present example, the patroller storage 615 comprises an internal database of parking events. Parking events contents, e.g. context data, may be references to content located in another database. For example, wheel images may be stored in a SQLite database and be linked to from parking events in the parking event database.

In the particular present example, the patroller service 610 and patrol manager service 620 communicate together under a Windows® Communication Foundation (WCF) technology to exchange certain data using a persistent connection. Exchange of parking data may take place over this architecture, however in the present example, in order to avoid having to initialize a persistent connection to upload a parking event, the communication of parking events from the patroller manager service 620 to the patrol service 610 takes place using a Representational state transfer (REST) architecture implemented using the Open Data Protocol (OData). In order to reduce the authentication burden required to secure the connection, the patrol manager service 620 uses a security token service (STS) whereby after an initial authentication, there is a token exchange with future communications being transmitted with a token for authentication confirmation.

Returning to FIG. 7, the patroller service 610 transmits 715 the parking event 505 in modified form to the patrol manager service 620 using WCF. The parking data, in this case the parking event 505 is received by the patrol manager service 620 at the parking enforcement server 605 via the network interface. The patrol manager service 620 may then transform the parking data, in this case to reformat it into a format suitable for storage in the parking data database implemented in patrol manager storage 625. The patrol manager service 620 then accesses the patrol manager storage 625 and stores 720 the parking data, in this case the parking event 505 in modified form in the patrol manager storage 625.

In some instances, parking data may be bulk uploaded. For example, where wireless connectivity is not constant, parking events may not be transmittable upon capture. To this end, the parking enforcement device 101 stores in the computer-readable memory 165 in association with each parking event therein an indicator as to whether the parking event has been transmitted to the parking enforcement server 605. If connectivity is lost and re-established, the processing device executes program code in response to the re-establishment of connectivity that consults the patroller storage 615 to identify on the basis of that indicator all parking events that have not been uploaded to the server (see step 810 in FIG. 8) and transmits them there to (step 815 in FIG. 8).

Figure 8:
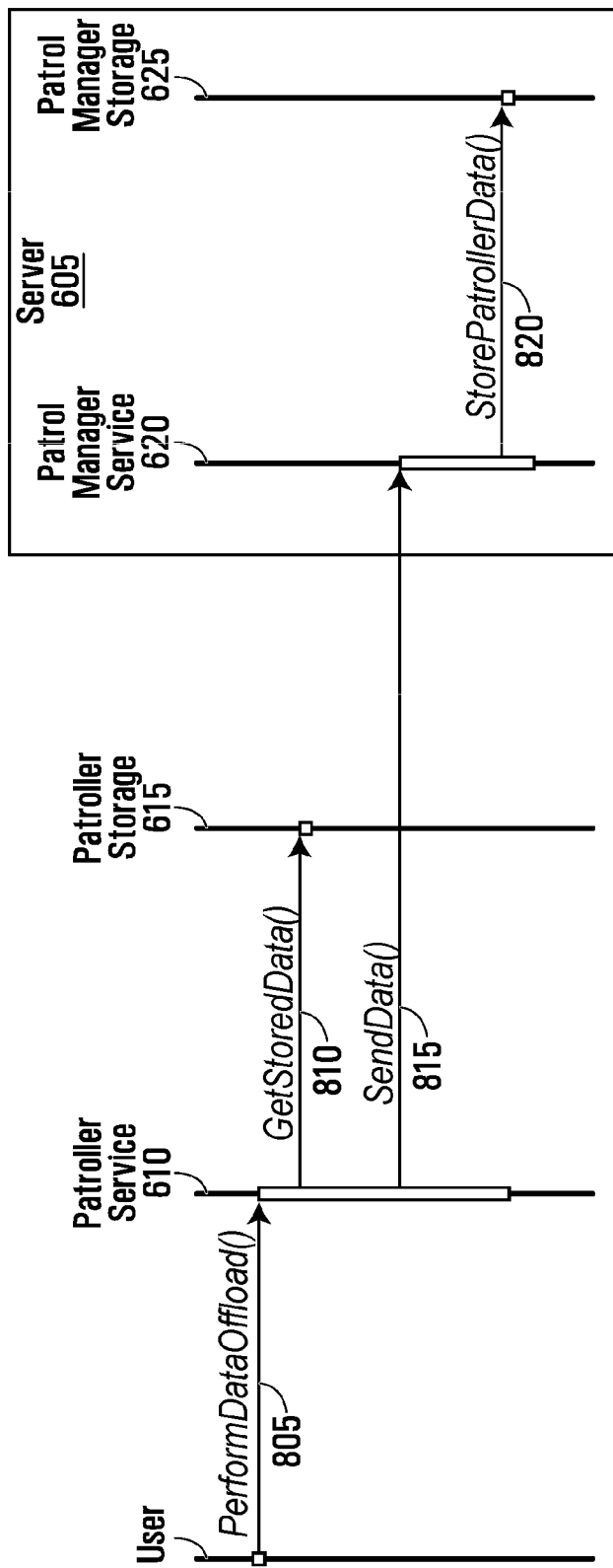
FIG. 8 is an event flow diagram describing transmission of parking data from the parking enforcement system of FIG. 1 to a parking enforcement server according to another particular example.

Other triggers for transmitting parking data to the server may be used. FIG. 8 illustrates another parking data transmission scheme implemented by the parking enforcement device 101. In this example, user input triggers the transmission of parking data from the parking enforcement system 100 to the parking enforcement server 605. In this example, a user of the parking enforcement system 100, e.g. an operator in the patrol vehicle 105, provides input 805 at the input device 150 indicative of an instruction to transmit the parking data to the parking enforcement server 100. The user input is received at the processing device 160 via the input device interface 205 and in response program code retrieving 810 from the patroller storage 615 the unsent parking events and effecting the transfer 815 of data as described above is executed. In this example, only the parking events found to be not previously transmitted to the parking enforcement server 605 are transmitted. In an alternative example, the user input may also be indicative of a subset of parking data to upload, in response to which the processing device 160 executes program code to identify the parking data of the subset within the computer-readable memory 165 and transmits it to the server as described above. Upon receipt the patrol manager service 620 decodes or modifies the parking data if necessary and stores 820 the parking data in the patrol manager storage 625. Optionally, the patroller service 610 may have multiple upload modes, such as an automatic mode as described above and a manual modes. It may be configured to switch between modes in response to user input comprising corresponding instructions. In some examples, a batch upload can be triggered upon connecting to a Wi-Fi® network or a manual upload can be done by downloading data onto a USB stick and walking it to the server.

Now the parking enforcement device 101 uses stored parking data representing past parking occurrences in order to determine parking violations. For example to determine overtime parking violations, the parking enforcement device 101 compares a recent parking event with past parking event to determine whether a vehicle has occupied a same parking spot for longer than the allowed period. This constitutes a violation and is determined as such by the parking enforcement device 101.

Provided is a technology that allows, inter alia, two different patrol-vehicles to be used to enforce parking regulations. A patrol vehicle may patrol a large number of parked vehicles. In one use case, a customer wants that a patrol vehicle that is different from the one that originally scanned an area, can continue to enforce parking overtime violations in this area. The system provides the ability to have two separate patrol-vehicles collaborate to enforce the parking whereby, in one example:

- The first patrol vehicle virtually "chalks" the parked-vehicles and collects data that might be needed to enforce the regulations. This information varies from municipality to municipality.
- A second patrol vehicle does the "check for chalk" a specific time-interval later. The time interval is greater than the time permitted by parking regulations of the given parking spaces. The second patrol vehicle may at the same time also "chalk" the vehicle for later use by it or another vehicle.

Traditionally the same patrol-vehicle that "chalked" the parked-vehicles must do the "chalk check" patrol because all data needed to do the enforcement is in the patrol-vehicle that chalked the parked-vehicles in the first place.

However, the present system enables bandwidth optimized communications between the second and first patrol-vehicles. This may be achieved in one example by direct peer-to-peer communications between the patrol-vehicles or by means of a central computer system (comprised of one or more computers) that mediates the communications between the two patrol-vehicles.

In either case, the communications bandwidth may be optimized by only relaying the information needed to detect the time-limited parking violation in the first place (e.g., parked-vehicle plate number, crop parked-vehicle license plate sub-image and GPS coordinates and time stamp of the "chalking" event).

In one example, data from two or more successive collections is compared. OCR technology is used to recognize and convert license plate information into raw alphanumeric text. Processing may be done during any or all of said collections, and be carried out either within a system present in the patrol vehicle, or off-site (as in the cloud). Once a vehicle has been identified in real time (e.g. at patrol vehicle speed) as having overstayed its allotted time for its respective zone, enforcement action (such as issuing a parking ticket) may be taken. Advantageously, the present technology trims unnecessary delays from aspects of the automation operation and provides improved processing speed.

To avoid unnecessary bandwidth, only key metadata may be exchanged (e.g. post-OCR license plate characters, certainty interval, GPS coordinates), with original and bandwidth-intensive photographic evidence archived for cases warranted by law, by jurisdiction policy, or to definitively assert whether a match has taken place prior to issuing a ticket.

Provided is technology for enforcing parking regulations whereby a mobile parking enforcement device determines a parking violation occurrence on the basis of parking data collected by the parking enforcement device and extraneous parking data which originates from another mobile parking enforcement device. In order to do so, the parking enforcement system 100 and more particularly the parking enforcement device 101 receives from the parking enforcement server 605 extraneous parking data originating from another parking enforcement device 101'.

Figure 9:
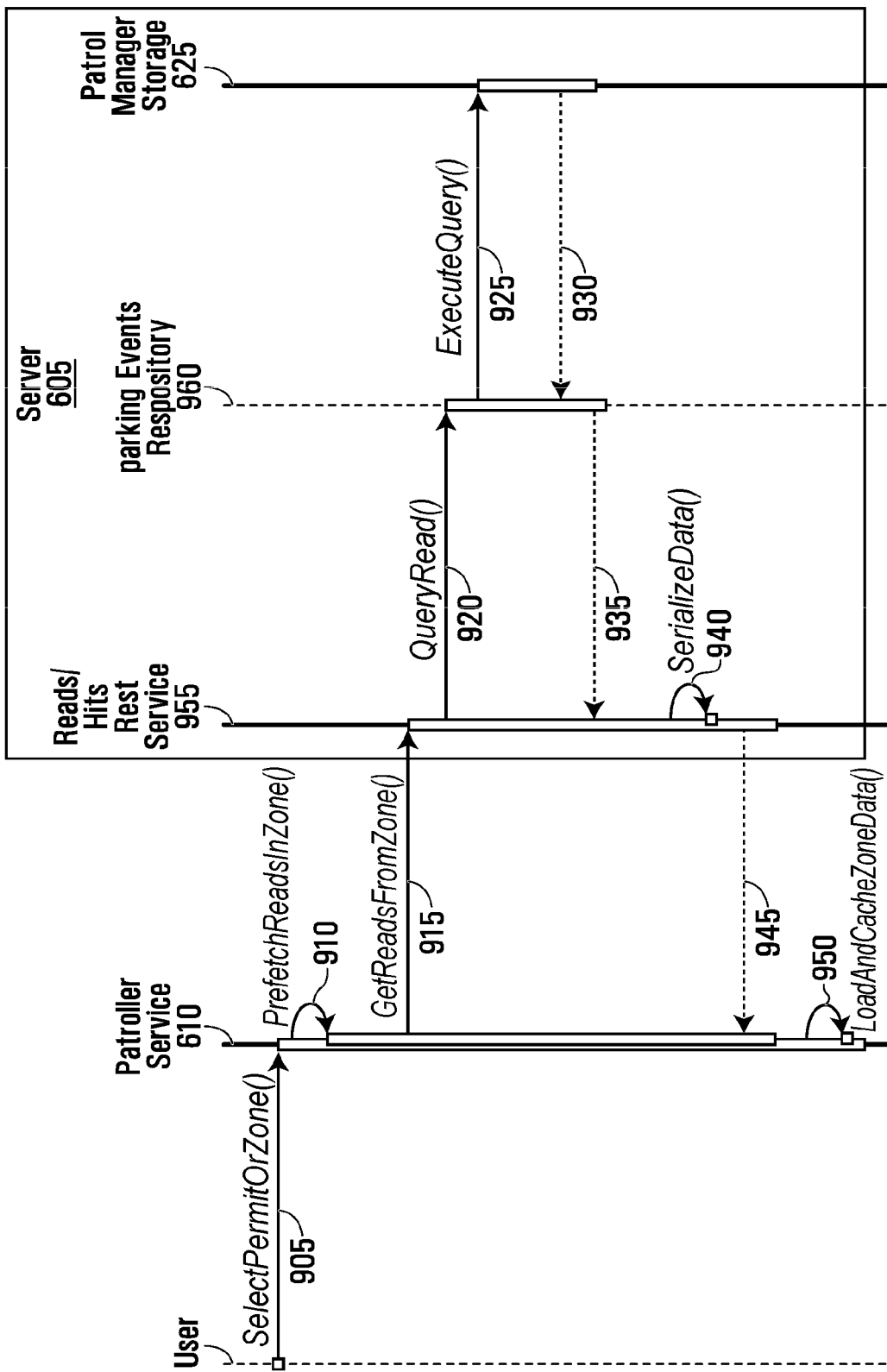
FIG. 9 is an event flow diagram describing the download of extraneous parking data from a parking enforcement server to the parking enforcement system of FIG. 1 according to a particular example.

FIG. 9 is an event flow diagram illustrating the parking enforcement device 101 receiving extraneous parking data from the parking enforcement server 605. The parking enforcement device of this example does not obtain all extraneous parking data but rather a subset pertaining to a particular parking enforcement parameters. Different parking enforcement parameters may be the object of parking enforcement. In this particular example, parking enforcement is divided into a number of parking zones. When the patrol vehicle 105 patrols a new parking enforcement parameter, such when it patrols a new parking zone, a user at the user interface 145 requests extraneous parking data for the particular parking enforcement parameter, e.g. parking zone. They do this by providing input 905 at the input device 150 representing an instruction to download the extraneous parking data from the parking enforcement server 605. The user input is received at the input device interface 205 and is transmitted to the processing device 160 whereupon it triggers the execution of program code causing the processing device 160 to request the extraneous parking data.

In executing the program code instructions, the processing device 160 first determines 910 what parking data is required based on the parking enforcement parameter in play. In this particular example, the user input 905 comprises instructions indicating a parking enforcement parameter, specifically a parking zone. The parking enforcement device 101 may alternatively or additionally itself determine parking enforcement parameters. In this particular example, the parking enforcement device 101 consults a lookup table providing the permitted parking time for the particular parking zone provided in the user input 905. In this example the lookup table is stored locally in computer-readable memory 165, but in alternate examples, the parking enforcement device may use the wireless communication device 130 to seek the permitted parking time from a service on the internet.

In an alternate embodiment, the parking enforcement device 101 receives location data from the GPS unit 125, and looks up the particular parking zone in which it is located in a lookup table as described for the permitted parking time. Where the parking enforcement parameter is determined by the processing device like here, the user input 905 need not provide it and the user interface may be accordingly simplified.

In a variant of this alternate embodiment, the downloading of extraneous parking data is not prompted by user input, but rather the requirement for such data is determined by the processing device 160 according to its programming. The parking enforcement device 101 may itself determine when new extraneous parking data must be request. In one example, the patroller services implemented by programming of the processing device 160 comprises a time tracker that determines the requirement for new extraneous parking data when a certain amount of time has passed, e.g. when the time since the most recent parking data received is approaching the parking time limit. It may determine this merely on the basis of the time of the last download, e.g. with a simple time counter, or it may consult the parking data stored in patroller storage 615 to do so.

In another example, the patroller service 610, implemented by programming of the processing device 160, regularly monitors the GPS location of the parking enforcement system 100 based on the input from the GPS unit 125 and determines when the parking enforcement system 100 enters a new a parking zone and determines the need for extraneous parking data based thereon. Again, the patroller service 610 may also consult the parking data stored in the patroller storage 615 to ascertain whether the parking data is required, e.g. whether the storage contains parking data for the particular new parking enforcement parameters, in this example for the new parking zone.

Thus the patroller service 610 determines what extraneous parking data is required, e.g. as a function of the parking enforcement parameters to enforce.

The patroller service then causes the transmission to the parking enforcement server 605 of a request 915 for extraneous parking data. In this example, the request 915 comprises parameters for the extraneous parking data, in particular here the parking zone. Optionally, the patrol manager service 620 may additionally perform a determination, similar to determination 910, of what parking data is required. For example, the patrol manager service 620 may determine a time frame for the parking data. In this example, however, the request 915 comprises all the parameters required.

The request 915 employs RESTful OData protocol. At the parking enforcement server 605, the patrol manager service 620 comprises a REST service 955 which interprets the request 915. Programming in the patrol manager service 620 then causes a query 920 to a parking events repository 960. The parking events repository 960 queries a database layer for accessing parking data from the patrol manager storage 625. Optionally, the parking events repository 960 may comprise a cache of recently sought parking data. The parking events repository 960 queries the patrol manager storage 625 using the database's protocols and receives in return parking data 930 which is extraneous to the parking enforcement system 100. This data may be decoded, modified or formatted to suit the requirements of the REST service 955 to which it is provided 935. The REST services serializes 940 the query results and transfers them in accordance with the REST OData protocol to the patroller service 610.

The extraneous parking data 945 is received by the parking enforcement system 100 at the wireless communication device 180. It is received therefrom at the parking enforcement device 101 by the wireless interface 190. The extraneous parking data 945 is then cached, and processed by the processing device 160 to load it into memory. The processing device 160 stores the received extraneous parking data, specifically the (partial) extraneous parking events, in computer-readable memory 165 in an organized manner according to a searchable structure.

The patrol manager storage 625 comprises a database of parking events created by parking enforcement systems like parking enforcement system 100. The parking events are stored in a different form than in the patroller storages, adapted to the particular database used. In this example, in the parking enforcement system 100 and more particularly in the computer-readable memory 165, the database schema is relational and is comprised of multiple tables that are normalized such that the data for a single plate read event is spread across multiple related tables and typically require a junction query.

In the parking enforcement server 605, and more particularly in the patrol management storage 625, the data is currently stored in a very flat and denormalized table. This format is optimized for insertion, query and retention processes that are specific to the patrol manager service 620. In this case, the data of a single plate read event is stored in a single row of a single table with images stored in a separate table.

The storage schemes in the parking enforcement system 100 and parking enforcement server 605 and the communication schemes therebetween are exemplary and variants are possible. In this particular embodiment, however, database schemas on both sides are optimized for their localized uses.

When the parking enforcement device 101 requests parking data from the parking enforcement server 605, the parking enforcement server provides in response a subset of the parking enforcement data stored in the patrol manager storage 625, as described above. In this example, the subset of data comprises a subset of the parking events, according to the parking enforcement parameters, as described above. In addition, in this example, only a subset of these parking events is provided. Specifically, the parking parameters including the vehicle identifier, time stamp, parking zone, and optionally other data are provided. This data is used by the parking enforcement device 101 to determine whether there is a potential violation and whether additional data, namely the context data is required. Since not all parking events received from the parking enforcement server 605 might result in a parking violation detection, sending only the parking parameters, and the context data only on an as-needed basis saves on bandwidth utilization.

Using parking data acquired locally, and extraneous parking data received from the parking enforcement server 605, the parking enforcement device 101 performs parking violation detections.

Returning to the example of FIG. 4A, having acquired the parking data pertaining to the parked vehicle 305 and created the parking event 505, the processing device 160 executes program code to determine whether the parked vehicle 305 has violated a parking regulation. At step 435, the processing device 160 performs a comparison of the past extraneous parking data pertaining to the vehicle 305 and the current parking data and determines on the basis of the comparison and at least one parking rule, whether a parking violation has occurred.

Specifically, in this example where past extraneous parking data is received in batches, this begins with step 415, where the processing device 160 accesses the computer-readable memory 165 to determine whether there is parking data that matches the parking data in parking event 505. In particular, the processing device searches through the parking data in memory, and more particularly searches through the partial or complete parking events stored therein to identify whether a stored parking event matches parking event 505.

Match determination may be ascertained on a number of basis including sameness or similarity/closeness of some parking data in a stored parking event and the parking event 505. In this particular example, the processing device 160 searches through the stored extraneous parking events received from the parking enforcement server 605 and compares the parking parameters of each extraneous parking events and the parking event 505 to identify a match. The parking enforcement device 101 may also consider other parking data. In the present example, the processing device 160 similarly processes locally-generated parking events to identify parking violation based also on readings taken by the parking enforcement system 100 itself.

A simplified process for match detection will now be described with reference to overtime violation for illustration. FIG. 4B illustrates the process undertaken by the processing device 160 to identify a match in an example where parking overtime violations are being detected. The process begins at step 415*a*. Match detection may be done on a variety of bases, which may depend on the type of enforcement being performed (e.g. overtime or shared permit enforcement). For example, in the case of overtime enforcement, the processing device 160 may search through the extraneous past parking data for another parking event having the same vehicle identifier and location. In the case of shared permit enforcement, the processing device 160 may search for a parking event having a same permit ID and a different vehicle identifier/license plate. To do so, the processing device may start by finding the beginning of the stored parking. The stored parking events, which in this example are extraneous partial parking events may be stored in a linked data structure with a reference indicating the first object. At step 415*b*, the processing device 160 determines whether a parking event was found. If there were none, the no branch is followed to step 415*j*.

The processing device 160 sequentially accesses the past extraneous parking event and retrieves the vehicle identifier stored therein, which in this example is license plate data. This is used to compare with the license plate data of vehicle 305 in the current parking event. If the vehicle ID of the extraneous parking event is stored in a different format than that of the parking event 505, translation or conversion may be performed by the processing device 160 at this step. This is true of other parking data stored in extraneous parking events. However, in this example, the extraneous parking data is converted by the processing device 160 upon reception by at the parking enforcement device 101 and as such is already in a form suitable for rapid searching and comparison. Thus at step 415*c*, the processing device compares the value of the license plate ID of parking event 505 and that of the stored extraneous past parking event. If they are not the same, then it is determined that there cannot be a match since the stored extraneous parking event corresponds to another vehicle. The processing device 160 then returns to step 415b.

If the vehicle IDs corresponds, then at step 415e the processing device 160 retrieves the location identifier from the extraneous parking event and compares it to the location identifier of parking event 505. At step 415f, if they do not correspond, then there cannot be a match, because although it may be the same vehicle, it was found previously parked in another location. The processing device 160 then returns to step 415b. Other criteria or rules may be applied. In certain cases, the location of the vehicle may be compared to ascertain whether it was found not (just) in the same parking spot but in the same position, same block face or same district, depending on the rules in effect and/or preferences of the purchaser of the system.

If the location identifiers correspond then at step 415g, the processing device accesses the time and date data from the extraneous parking event and compares it to the time and date data of the parking event 505. Specifically, the processing identifier computes the time difference between the two parking events and ascertains whether the time difference exceeds the permitted parking period. If it does not, at step 415h, then there cannot be a match, since the parked vehicle 305 has been found to be previously parked within the allowed period. The processing device 160 then returns to step 415b.

If the time difference is found to exceed the allowed parking time, then there may be a parking violation. A parking violation is determined, wholly or in part, to the comparison of the extraneous parking event and the parking event 505 as applied against programmed parking rules.

In some embodiments, the processing device 101 may conclude an overtime violation on the basis of the above alone, and proceed straight to step 436. However, in the present embodiment further processing is involved.

At step 415i, the processing device 160 creates a hit event, which represents a potential parking violation. The hit event identifies parking data and/or parking events evidencing the (potential) parking violation. In this example, the hit event comprises references to the parking event 505 and the matching extraneous parking event. The hit event is stored by the processing device 160 in the computer-readable memory 165. Further processing is done to confirm the parking violation.

Although a hit event is recorded at step 415i, in this embodiment the processing device returns to step 415b to search for more parking event matches. There may be other parking events matching parking event 505, which may provide further evidence of the violation, additional violations such as violation of multiple time periods, or provide additional information on the parking violation such as a magnitude of the violation (amount of time overrun) which may be pertinent for example if applicable fines are related to the violation magnitude.

At step 415b, the processing device ascertains whether there is another stored parking event to consider. In this particular example, the data structure storing the parking events comprises a linked chain of parking events and terminates in a null event identifier and step 415b comprises verifying whether the current parking event points to another instantiated parking event object. If there is another stored parking event, then the processing device proceeds to step 415c, where it accesses the next parking event and the above steps are repeated. Should another match be found, then another hit event is created and a hit counter is incremented to identify the number of hit founds. If no further events remain to be considered at step 415b, then the processing device proceeds to step 415j, where it verifies whether any hits were found. In this example it does this by ascertaining whether the hit counter has a non-zero value. If it does then at step 415k then it provides the output hit events as output to the process of FIG. 4B. In this example this occurs in that the program module implementing the process returns a positive indication of hits, in this example by providing the hit counter and a reference to the hit events created. If no hits were found, then at step 415l, the processing device 160 provides as output of process of FIG. 4B and indication that no match were found. In this example this occurs in that the program module implementing the process returns a negative indication of hits, in this example by providing the hit counter value of zero.

Parking events may also be provided with unique parking event identifiers generated in one example by the parking enforcement devices. Each parking enforcement device may have a unique code which is used along with a non-repeating sequence to provide a unique identifier to each event. The process of FIG. 4B may also include the step of verifying, prior to processing a stored parking event that it is not identical to the parking event 505 and, optionally, to other parking events already considered.

Figure 14A:
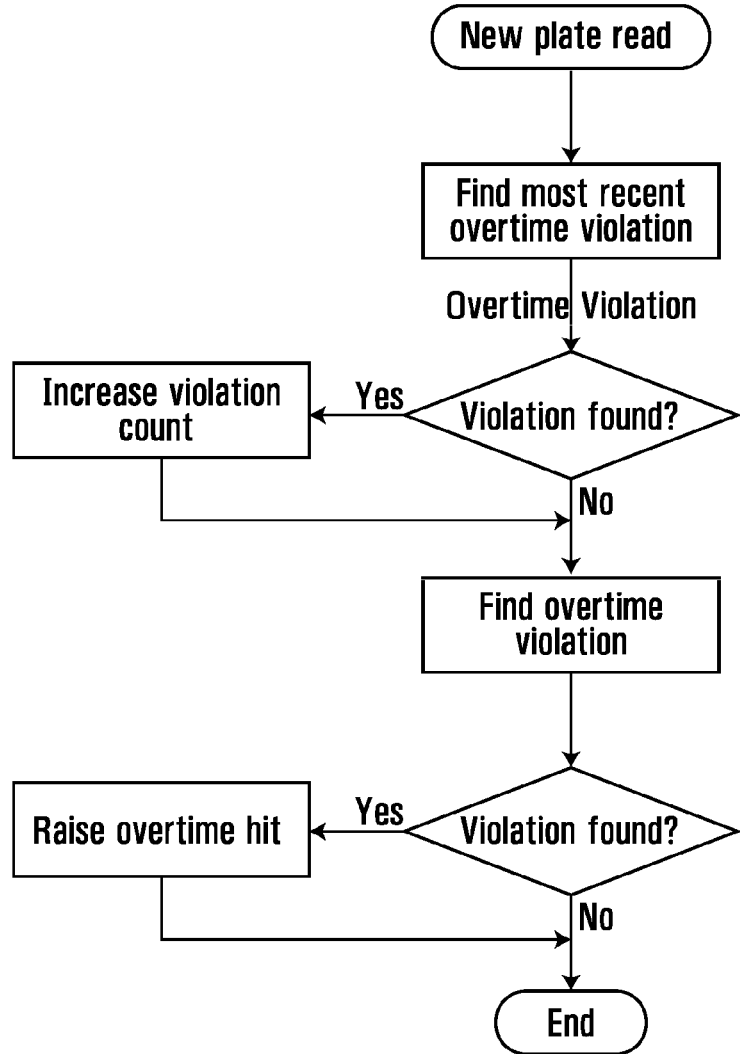
FIG. 14A illustrates a flow chart representing an overtime violation detection algorithm according to a particular example.
Figure 14B:
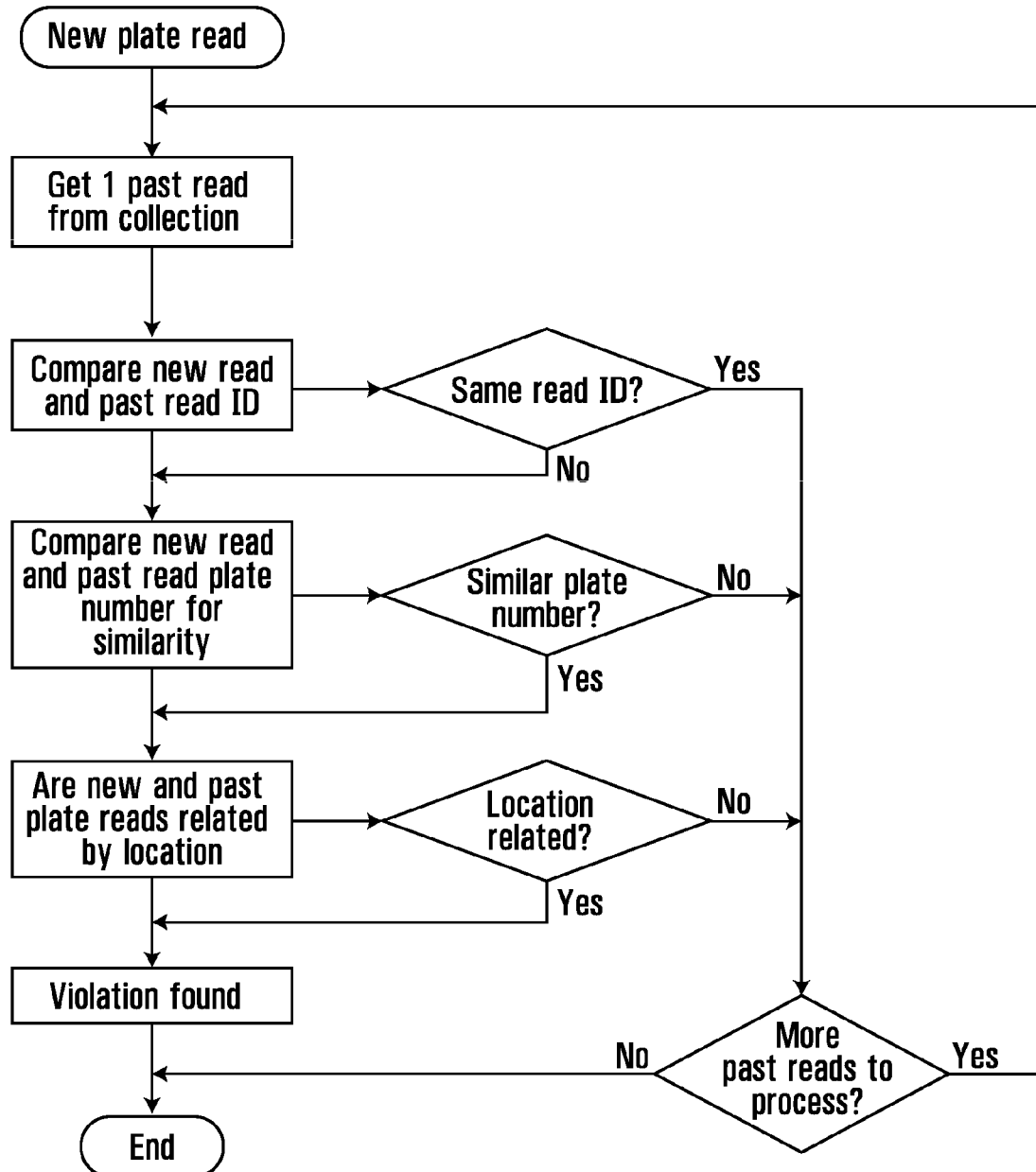
FIG. 14B illustrates a flow chart representing the steps to find an overtime variation step in the algorithm of FIG. 14A.

The foregoing is a simplified description intended to enable the reader to produce a working system. A more detailed description of an overtime parking violation detection algorithm is illustrated in FIG. 14A and FIG. 14B, where FIG. 14A represents an overtime violation detection algorithm and FIG. 14B illustrates the algorithm implemented in the Find Overtime Violation step of FIG. 14A. In this example, Read ID comparison is based on a unique identifier of a plate read event, which is used to avoid detecting a violation based on a same plate read event. Plate read similarity is based on fuzzy matching logic that considers similarities based on optical character equivalences and character substitutions as a function of plate number string length. Location similarity is a function of the overtime rule in effect. Three different comparisons may be used here: same position with preset distance tolerance, same block face based on street intersections and same district based on complete parking zone.

It should be noted that the order of steps 415c-415h is exemplary and that the different parking parameters may be performed in a different order. Likewise other comparisons and verification may be performed such as permit data comparisons and other data comparisons and verification of whether the vehicle (e.g. based on license plate or permit data) is authorized to park and/or to exceed an allowed time period.

The above description is provided with reference to overtime violation in order to allow the reader to better understand the algorithm. A permit overtime violation may be considered a subcase of the overtime violation where the vehicle 305 has a permit for a certain zone but the permit only allows the vehicle to be parked for a certain amount of time. In such a case, an additional step of verifying whether the vehicle identifier is associated with a permit, and the allowed time period associated with the permit may be added.

The algorithm of FIG. 4B may be modified to detect shared permit violations. In such a case, the vehicle identifier may be looked up in the permit list at step 415a, and the permit identifier may be used instead of vehicle identifiers in steps 415c and 415d. Likewise instead of finding and comparing location information at steps 415e and 415f, the vehicle identifier may be used (and compared to the vehicle identifier from a extraneous past parking event) to detect whether the same permit is used with two different vehicles. In terms of time and date data in steps 415g and 415h, the constraints associated with the permit ID (e.g. no two vehicles may use the same permit on the same day in the same zone) may be applied. As mentioned above, more complex permit constraints may be used, with the algorithm being adapted according to the permit constraints.

Figure 14C:
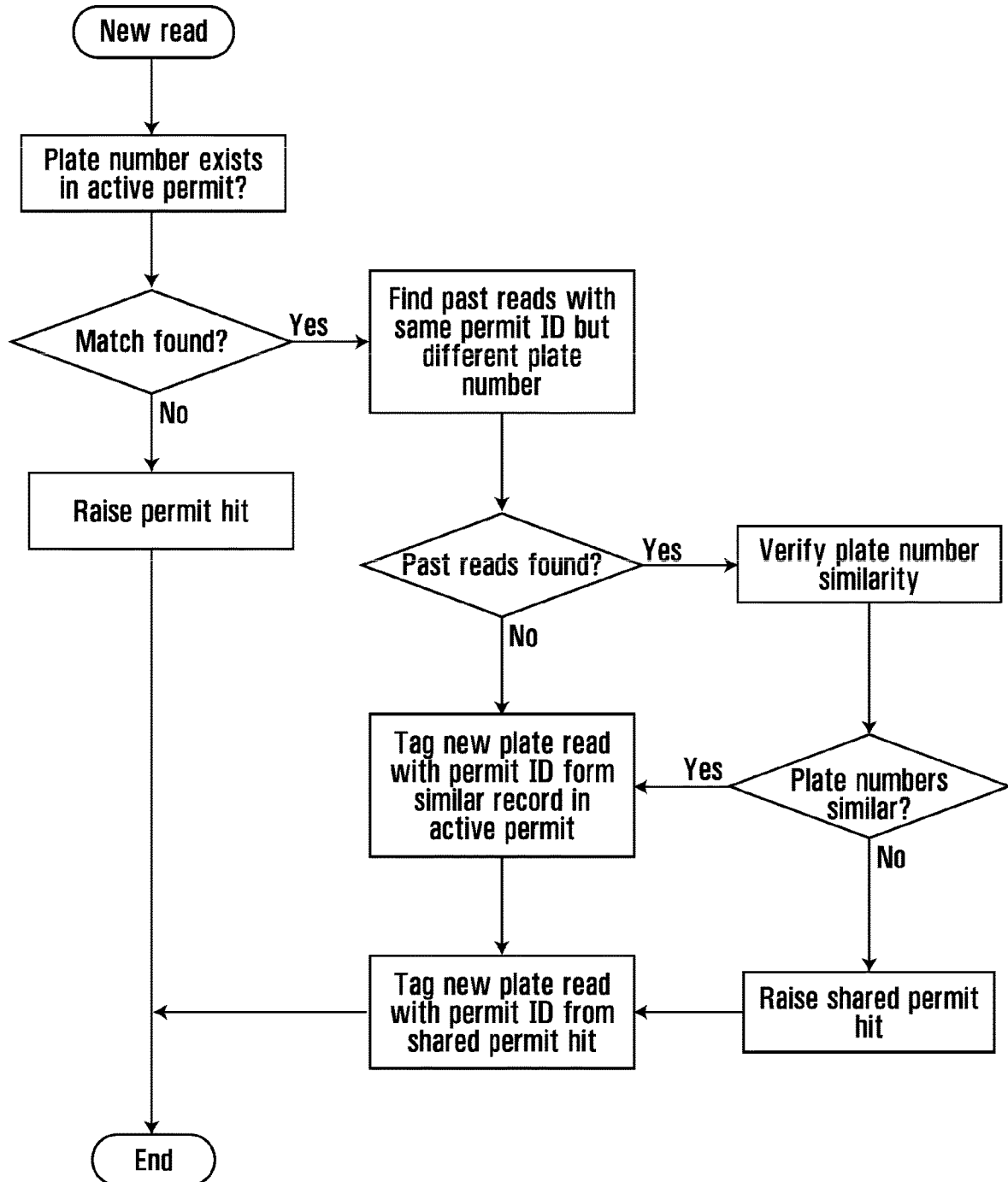
FIG. 14C illustrates a flow chart of a permit violation detection algorithm according to a particular example.

Here too, this description is a simplification. FIG. 14C illustrates a permit violation detection algorithm, according to another example. In this example, a shared permit hit requires that two reads are made in the same permit zone with the same permit ID and within the maximum time limit for such a violation. Plate number similarity (with those in the permit list) is based on fuzzy matching logic that considers similarities based on optical character equivalence and character substitutions as a function of plate number string length. A permit hit is raised when the platen umber is not found in the permit list, i.e. when the vehicle is not allowed to park in the zone. A lookup is done for past reads in the same permit zone which are identified as being linked to the same permit ID as the read found in the permit list. If no past reads are found, the new plate read is tagged with the permit ID of the permit record that matches best using the permit matcher settings. The new plate read is tagged with the permit ID identified in the shared permit list.

In one example, the permit list comprises entries having the format <plate state>; <plate number>; <permit ID>; <permit category>. The list may contain the following two records: BC; AAA111; 55; P1 and BC; ZZZ999; 55; P1. In such an example the following exemplary event sequence may take place:

Plate AAA111 is read (1$^{st}$ read)

Using the permit matcher settings, the plate number read is found to be similar to AAA111 in the permit list, hence no permit hit is raised.

There are no past reads, hence no shared permit hit can be raised.

Plate read AAA111 is tagged with the permit ID 55 since it is the only matching record in the permit list.

Thirty minutes later, plate ZZZ999 is read (2$^{nd}$ read).

Using the permit matcher settings, the plate number read is found to be similar to ZZZ999 in the permit list, hence no permit hit is raised.

A past read exists (AAA111 with permit ID 55) in the system which was done within the maximum limit of (e.g.) 2 hours. Using the shared permit matcher setting, it is determined that the past read and the new read are two different vehicles.

A shared permit hit is raised between AAA111 and ZZZ999 for permit ID 55.

Returning to FIG. 4A, at step 420, the processing device ascertains whether a match was found based on the output of the process of FIG. 4B, FIG. 14C or FIG. 14A and FIG. 14B. If no match was found, the processing device determines that no parking violation occurred at step 425. It may perform further verifications, e.g. for other types of parking violations. For example, both overtime and shared permit violation may be tested for in sequence (or by separate threads, or the like). In one example, the processing device then executes program code for causing the user interface, specifically the display 145, to provide the user an indication that no violation was found.

In the particular example shown here, upon finding a match between the parking event 505 and an extraneous parking event, the processing device performs further processing using additional parking data related to the extraneous parking event to confirm the violation. In particular the processing device uses context data related to the extraneous parking event. To this end, at step 430, the processing device causes a request to be transmitted from the parking enforcement system 100 to the parking enforcement server 605 for the context data corresponding to the matching extraneous parking event found to match. This request identifies specifically the parking event, in this example using the parking event's unique identifier which was provided with the parking event data previously provided by the server. The request also specifies which parking data is requested which in this case is the context data including context image(s) and tire image(s).

In response to the request the patrol manager service 620 of the parking enforcement server 605 retrieves the requested parking data from the patrol management storage 625, performs the necessary transformations for transmission, and transmits it to the parking enforcement system 100 where it is received by the parking enforcement device 101 at the wireless interface 190. This process may be done similarly to the process of requesting from the server, retrieving at the server, transmitting from the server and receiving at the device the parking events as described above.

Still within step 435, the processing device 160 executes program code to perform a parking violation confirmation based at least in part on the additional parking data received from the parking enforcement server 605.

In the present example, the confirmation is a two stage process. At a first stage (not shown) of confirmation, the processing device causes the video output interface 200 to drive the display 145 to provide a visual indication that a potential violation was found, and outputs to the display 145 context data both from the parking event 505 and the matching extraneous parking event(s). In particular, the display 145 may be caused to display first a color image of the parked vehicle showing the license plate, and optionally a cropped and zoom monochrome image (taken by the infrared camera) image of the license plate from both parking events. The processing device 160 then executes code listening for user input at the input device 145 indicative of a confirmation that the vehicles and plates match.

If the user confirms the plates and vehicles match, a second stage of confirmation occurs. At step, 431, the parking enforcement device 101 acquires tire images from the parked vehicle 305 as described herein. Although this step is shown as being performed after step 430, it may be performed earlier in the process, for example tire images may be provided as after a plate read is received as soon as they are available. At the second stage of confirmation, the processing device causes the video output interface 200 to drive the display 145 to outputs at the display 145 tire images from both parking events. If tire images of more than one tire are stored, tire images for each tire of each parking event may be provided. Optionally, where multiple tire images are stored for a same tire of one or both parking events, the processing device may accept input requesting a change of image to another image of the same tire and/or vehicle and thereby allow the user to cycle through the tire images. The processing device 160 then executes code listening for user input at the input device 145 indicative of a confirmation that the tire images match, specifically in this case that the tire images indicate no movement of the vehicle between parking events. In the present example two sets of 30 tire images from each parking event is presented to the user.

If the confirmation failed at either stage, that is if the user input indicates no match, then the processing device may execute code dismissing the potential violation, for example here by removing the hit event(s) and proceeding to step 425.

If the parking violation was confirmed at step 435, then the processing device determines that a parking violation has occurred. It may then proceed to step 450 where a parking violation event is created, which may be an object comprising data pertaining to the parking violation, including parking data from the parking events confirming the violation. In the present example, the violation event is a data object that comprises an indication of the regulation found to be violated, data on the parking enforcement system 100 and/or user that determined the violation, and references to the parking events evidencing the violation and/or the parking data contained therein. The violation event is then transformed for transmission, including serialization, and transmitted to the parking enforcement server 605 using WCF communications for processing by the parking enforcement server 605.

Optionally, the parking enforcement system 100 may also comprise ticketing hardware controlled by the parking enforcement device 101 to print or otherwise emit a parking ticket and the processing device 160 may be configured to control the ticketing hardware to emit the parking ticket which the user may then provide to the parked vehicle 305.

At the parking enforcement server 605, the violation event is processed. In one example, it is stored in a persistent storage as evidence and added to a list of parking violation to process for fine collection.

Other permit detection technologies may be used. For example, RFID permits may be scanned with an RFID reader with high reliability. Context images may still be stored, e.g. for evidence in case of a contestation.

Rather than downloading from the parking enforcement server 605 parking data in bulk, as described above, parking data may be requested on an as-needed basis. For example at each reading or parking event creation. In certain variants, rather than storing a list of parking events from the server, the processing device follows step 410e by requesting from the server, e.g. in the method described above with respect to bulk downloads, parking events having certain parking data corresponding to the parking event 505 based on the nearby parked vehicle 305. In such a case, the searching steps 415b and 415c may be performed at the parking management server 605 based on parking data transmitted to it from the parking enforcement system 100.

Comparing two license plate reads may be based on comparing unique elements of the license plate, similarity of license plate number (same length, same maximum character size), other similarities (same zone, same polygon), similar geographical position (positioned within a same zone, same block face—e.g. with respect to an intersection, same district). There may also be a maximum time allowance between the two reads (e.g. 12 hours) outside of which a violation is not considered to have taken place, according to the parking rules.

After a hit is found, the driver of the patrol vehicle may be is alerted as described so that he stops his patrol, and possibly backtracks, to confirm the violation. To confirm the violation, the patrol vehicle may request additional data from the other patrol vehicle comprising parking enforcement system 100' either directly or through one or more intermediate servers. In the case of direct communication between parking enforcement systems, a peer-to-peer network may be established to that end. Again, in order to optimize bandwidth, only enough information to confirm the violation is retrieved by the second-patrol-vehicle. This information may be jurisdiction dependent and thus may vary per implementation. This may include a series of pictures of the parked-vehicle's wheels to demonstrate that the vehicle has not moved by comparing the positions of the wheels stem valves. If the vehicle has moved, it is highly unlikely that the stem valves are in the same position in the first and second images.

Finally, if the patrol vehicle's parking enforcement agent judges that there is likely enough evidence to cite the vehicle for a parking regulation violation, more detailed information might be requested from the first-patrol-vehicle to document the infraction. Such information might include higher resolution images of the parked-vehicle. A package containing all the data collected to enforce the parking infraction is gathered and uploaded to a central computer system either in real time or with deferred time.

The parking enforcement server 605 may comprise one or more dedicated computers, or be a service hosted in a cloud service.

In one implementation, a system comprising a patroller service 610 software running on a processing device in a patrol vehicle and a central server application running on one or more computers which comprises a license plate recognition module (or LPR Manager) which has a managerial role over one or more (typically a plurality of) patrol vehicles and more specifically patroller services 610 is provided. The sharing of data between patrol vehicles (in this example, between patroller services 610) serves mainly to maintain in all patroller services 610 associated with the same LPR Manager role, the readings for specific areas. Readings may include parking data such as location (e.g. GPS) information, visual information, time information (e.g. time stamp) and identification information (e.g. license plate). The parking data may also include image data, e.g. partial image data. This ensures that a patroller service 610 has access to recent reads of last X days (a selected or predetermined timeframe) made in the same area by the other patroller services 610. The number of days corresponds to the value of "Reads Retention" of the patroller service 610. As described herein, provided is the data transfer but also the user interface of the patroller service 610, the configuration, the role and the license.

The system provides local readings and shared readings. For the user, there may be no difference visible in the present embodiment in the user interface about the readings, which may both be presented in the same manner. In one example, only the local readings are sent to the LPR Manager role during the offload of the data from the patroller service 610 to the central server and only the patroller service 610 to which belongs the most recent reading of a pair may raise a hit.

The data transfer may take place as follows. In order to withstand the scenarios with and without persistent connection, the user is able to configure when the data will be downloaded from the central server to his patroller service 610. He can choose to manually download the data for specific areas or have them automatically downloaded (via the configuration on an event: zone selection, starting the patroller service 610 (all reads)). The context images may also be downloaded on request (persistent connection) or downloaded with the readings (if the image is missing, the patroller service 610 will display an image by default). The readings downloaded appear in the patroller service 610 without differentiation of local readings.

The downloaded data may persist locally as long as space permits and that the duration of persistence is not reached. In case of lack of space, the downloaded data outside the current zone will be erased.

As the quantity of readings transferred can be important, it may be done by pieces in order to withstand cuts and resumptions of network communication.

If a zone is selected again after the initial download, only the readings more recent than the last download (by the patroller service 610) are imported in this example. The locally-originating readings may be omitted from download.

The readings that occur (downloaded from central server or other patrol-vehicles) while the option "Reads Paused" is active are buffered until the option is disabled (i.e. have no appreciable effect on the IU or the workflow).

The readings will be available to the other patroller services 610 from the time they will be uploaded to the central server. This may require in some embodiments an explicit "offload" operation to ensure that the "live" data that could not be routed (cut off the network connectivity) are indeed transferred.

Figure 10:
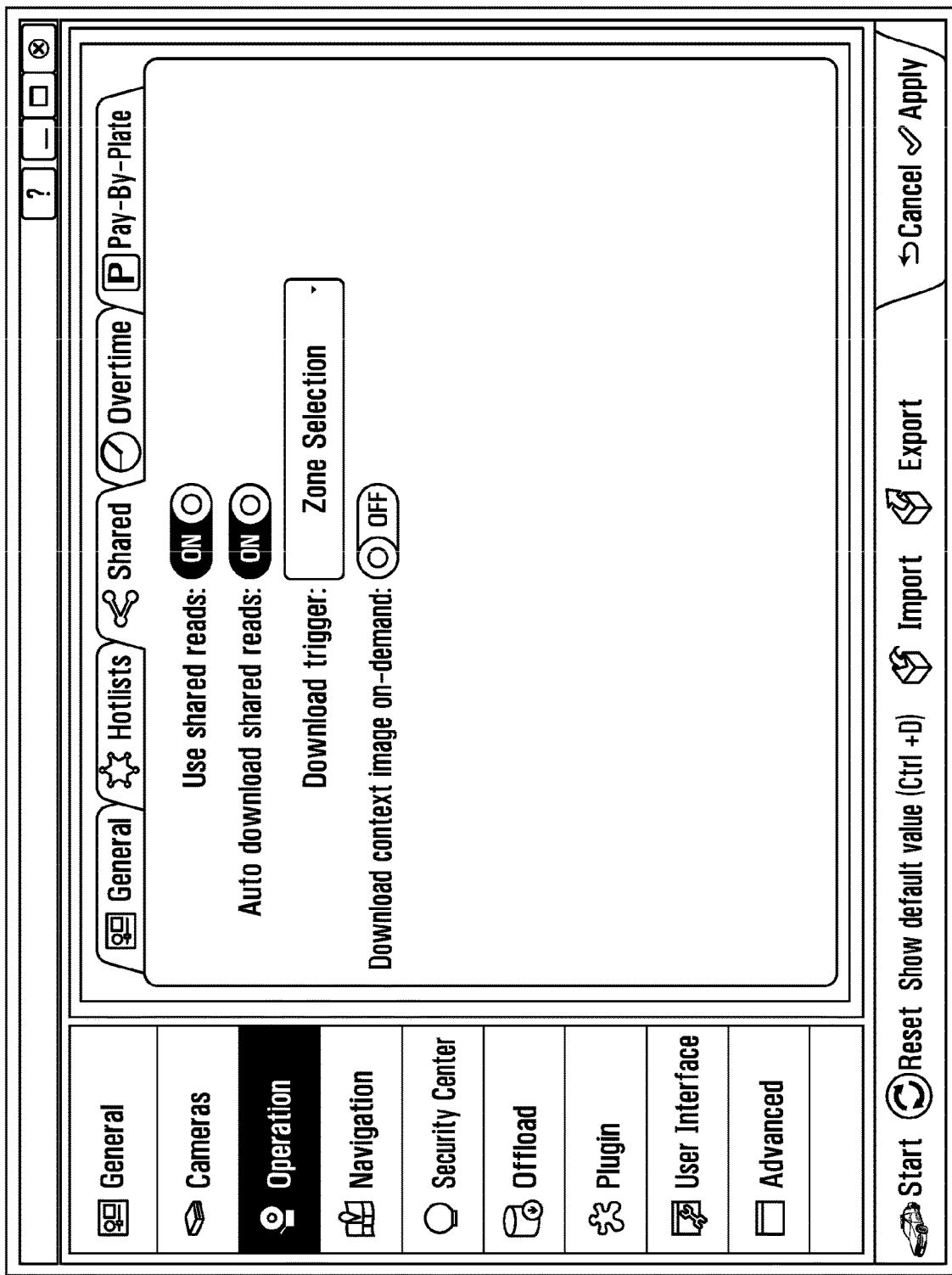
FIG. 10 illustrates a screenshot of a user interface showing a configuration tool for a patroller service software showing certain user options according to a particular example.
Figure 11:
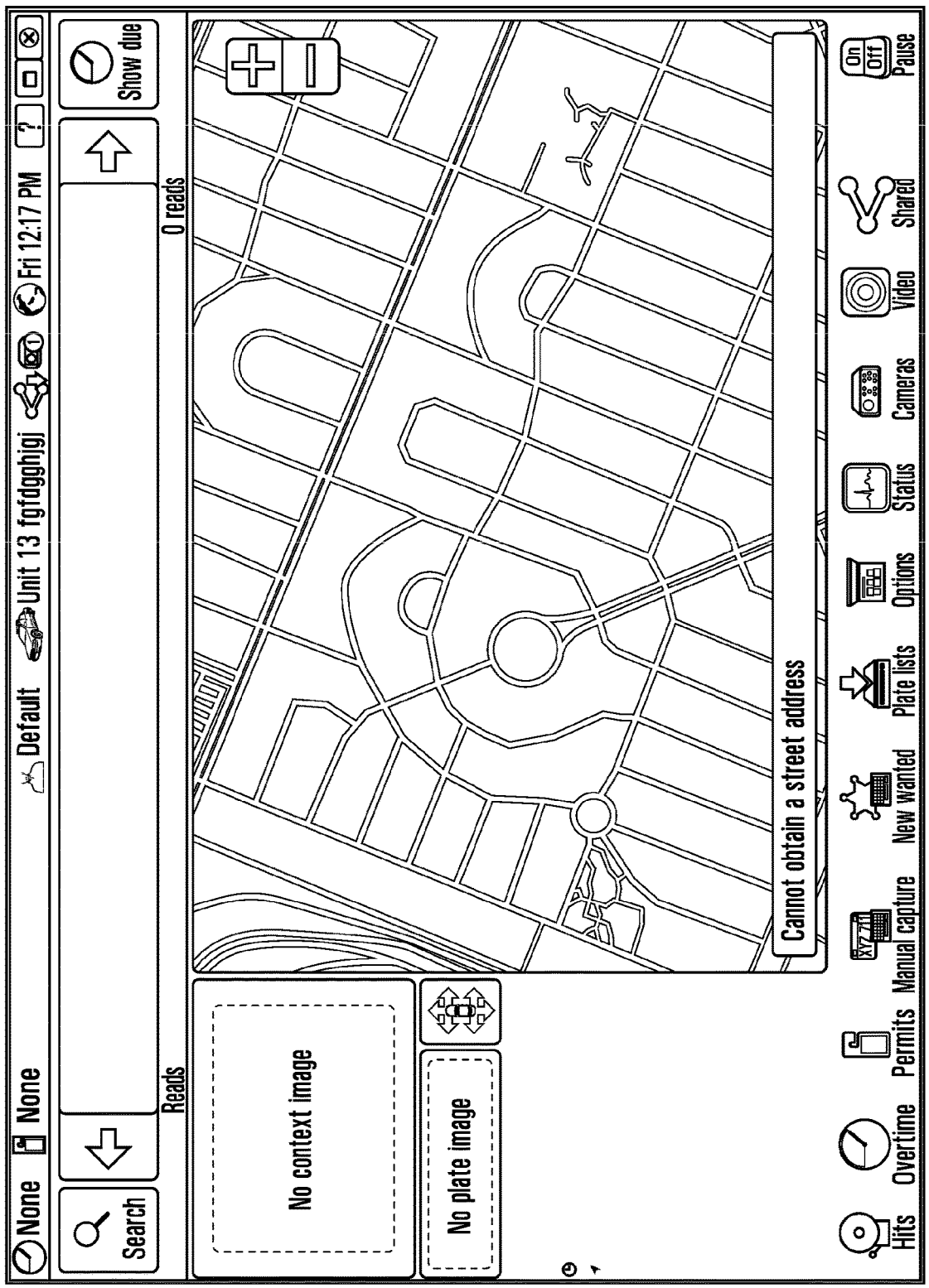
FIG. 11 illustrates a screenshot of a user interface of a patroller service software showing a navigation pane.
Figure 12:
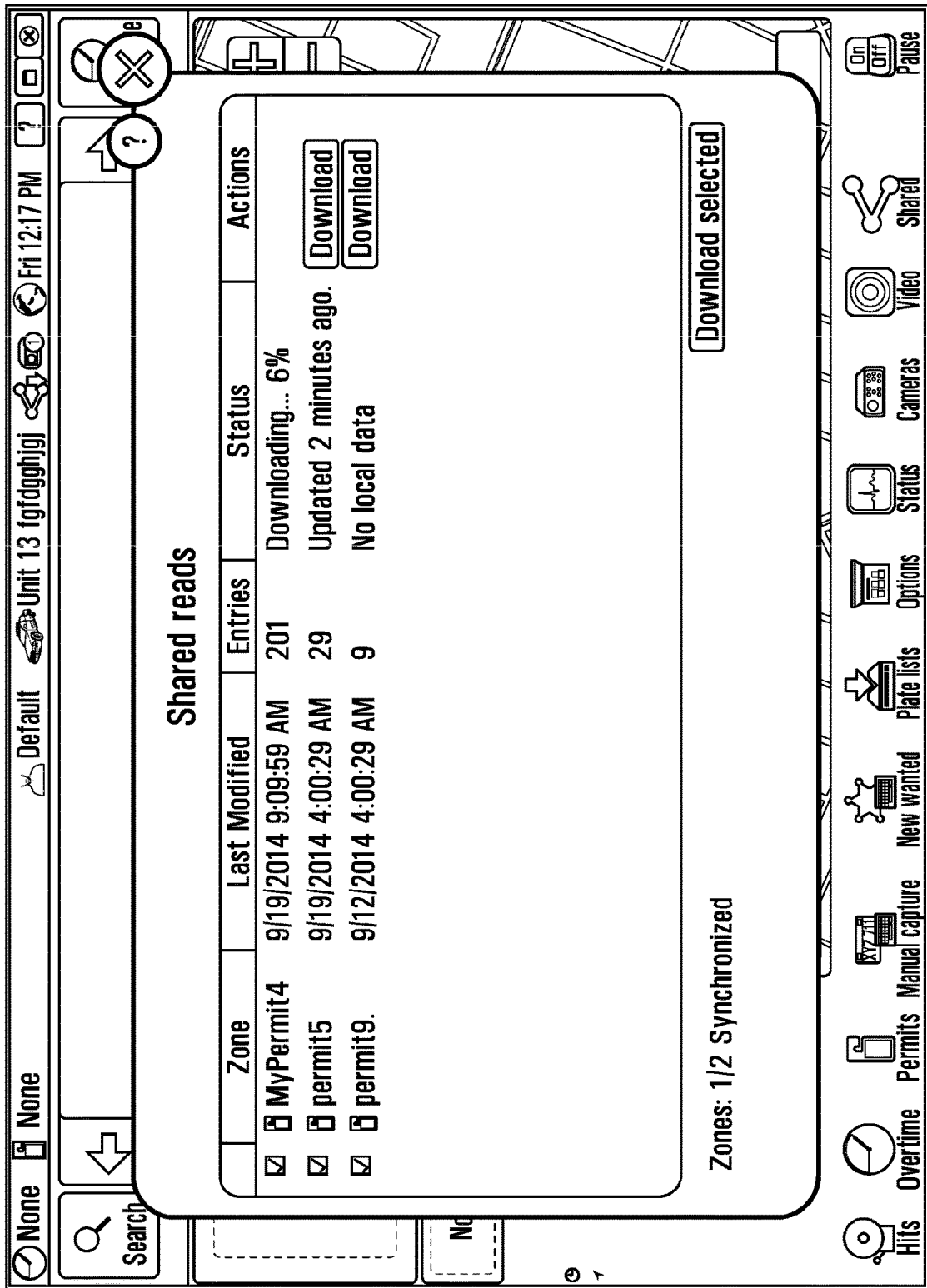
FIG. 12 illustrates a screenshot of the user interface of the patroller service software FIG. 10 showing a synchronization window.

Refer to FIG. 10-FIG. 12 for the user interface and configuration according to a particular example of implementation. As shown in FIG. 10, a shared tab under an operation category allows a user to select whether shared reads are used and whether to automatically download shared reads. The trigger for the download may be selected, in this example the download trigger is related to zones, e.g. entering a zone or based on availability of reads in a selected zone. FIG. 11 shows a navigation pane. FIG. 12 shows a synchronization window whereby synchronization status can be reviewed, e.g. showing read data downloaded from other patroller services 610.

In terms of the license, the provided feature allowing sharing of read data may be licensed separately from the license for, e.g., patroller services 610, central server application, LPR management, or more broadly a license for an overall patrol system. The feature may be activated or deactivated according to the license held by a particular user and may be based on the number of patroller services 610 allowed with the functionality. Activation may occur in an XML file that contains this and optionally other options.

In one embodiment, the patroller service 610 starts importing on zone selection and perform follow-up with transfer indicator displayed to the user.

In case of a power outage, the patroller service 610 may resume data transfer after the outage. A transfer window and indicator may be provided to the user in the patroller service 610.

Another feature of the patroller service 610 may be that received and buffered reads are downloaded when "Reads Paused" option is enabled. The downloaded reads may be added in database, they may be added to the workflow and the user interface may be adjusted accordingly.

The patroller service 610 may automatically delete the downloaded data not relevant in the case of lack of space by applying a discrimination algorithm (e.g. when the available space falls below a certain threshold) to the existing data selecting the data not relevant according to a particular criterion or criteria, e.g. pertinence to a distant zone or age of the data.

The patroller service 610 may produce generated images for reads downloaded without images.

As discussed, the patroller service 610 may download reads on a trigger. Optionally, the patroller service 610 may also download on demand the images for a read. Information about the source of the read may be included in the parking data and may be added in the details pane of the read event. For example, data concerning the patroller service 610, camera, patrol vehicle, time captured etc. of the captured data may be added and provided alongside the data when downloaded and visually displayed to a user alongside the data.

The patroller service 610 may implement separate statistics of local reads and downloaded reads. It may also exclude reads downloaded from the "Offload" operation and/or exclude the reads downloaded from the "Live transfer" operation.

As discussed, the patroller service 610 may implement a functionality availability/enablement by license to allow selective enablement and disablement of the presently described system.

The patroller service 610 may implement a hit workflow such that a hit is triggered only if the read is local to the patroller service 610.

As for the patroller service 610, it may be provided with logic to implement the presently described system, including an API to request the relevant reads (complete or partial by patroller services 610). It may also be provided with a stored procedure to collect the relevant reads (excluding local reads) from a database.

The present provides the ability to share databases amongst vehicle (If vehicle equipped with good Internet) if a city has 5 vehicles for example, one may lay chalk marks and another may go over and pick up expired time. This provides an ability to share virtual tire chalk. Thus a Patroller A may read a car and a Patroller B may read another car on the same car and raises the infraction/hit.

Shared reads between patrollers integrates several features of communication between patroller units, e.g. in a peer-to-peer fashion or through an interface with a server.

In one example, a customer with a large campus may not be able to cover the entire campus with one car. It would be impossible to detect a shared permit (whereby two users use a same permit) if the two users are parked at opposite ends of the campus. The present technology allows for detection using more than one car by allowing multiple patrol vehicles to share parking data. The patroller systems may comprise permit detection technology and the parking data may include permit information for detecting multiple uses of a same permit.

In one example, the patrol manager service 620 provides a service to the patroller service 610 which allows it to request reads, hits and images on demand based on one or more specific search criteria. The service may be REST based and use the same user authentication as the patroller, meaning that no additional login credentials are required to use the service. It may not, however, in this example be open to anyone and access must be restricted by appropriate measures. Information query may be based on a variety of criteria including those described herein. The service may be provided as an enforced low priority so as to not interfere with other functions of the patroller system. Instead of retrieving images upon information requests, an identifier may be provided instead allowing separate retrieval of images. The amount of returned information may be limited in time configurable at the server (e.g. no more than 24-hour worth of data can be returned).

For example:
 The patroller service 610 requests all the reads done in the past 24 h in a given permit zone,
 The patroller service 610 request all the hits raised on a given overtime rule in the past 8 h, The patroller service 610 requests the context image and LPR image of a specific read, or The patroller service 610 requests the tire images of a specific read.

In one embodiment the patroller system has the ability to query the patrol manager service 620 role using a REST service in order to retrieve Reads and Hits that were done within a specified timespan in a given zone, or for a given rule so that it can generate hits based on reads done by another patroller service 610'. In one example the system may:

Provide an API to query reads or hits based on, e.g., Zone ID and/or Rule ID,

Provide returned read or hit information that is minimal, e.g. just the plate number, plate state and timestamp, Provide an API to query the detailed information (metadata) of a specific read or hit id This API might be only invoked when details information is to be displayed in the patroller service 610, The returned information might not include images, The API may be secure, versioned and enforce the licensing limitations of the invoking patroller service 610 (e.g. permit queries accepted only from permit officers, etc. . . . ). In one example, only patroller service 610 software may call this API.

In one embodiment, the patroller service 610 has the ability to query the patrol manager service 620 role using a REST service in order to retrieve images from existing Reads and Hits, e.g. to generate a hit based on information read from another patroller service 610'. In one example, the system may:

Provide an API to query images based on, e.g., Read ID and/or Hit ID,

Provide returned images include LPR and Context Image (tire images are excluded), In one example, the patrol manager service 620 is configured to receive patroller wheel images, store them and have them available through the on-demand image service for later retrieval by the same or another patroller service 610. The patrol manager service 620 may be configured to receive and temporarily store tire images from patroller service 610 reads in overtime with wheel images. The patrol manager service 620 may be able to serve a limited amount of wheel images (maximum 30) for a given read at the request of a patroller service 610. The patrol manager service 620 may automatically purge the tire images from its database so as to limit the amount of space used on disk.

For example:

Patroller A does the first overtime+wheel imaging read on ABC123 @ 9:00, this information is sent either live or offloaded to the server.

Patroller B enters the overtime zone, downloads the previous read information (excluding all images) and eventually reads ABC123 @ 16:00 which is passed the 2 h parking limit for that zone.

Patroller B raises an overtime hit and queries the server for the wheel images captured by Patroller A at the first read.

This allows the operator to validate that the car has not moved since the first read was made and can issue a violation ticket.

In another example, e.g. in a city which has many patrollers, a single vehicle may be required previously to do both drop chalk and pick up chalk. However, the present system allows the option for different cars to drop and pick up the chalks. So Vehicle 1 (V1) sees a car at T1 and drops chalk. A different vehicle V2 can then see the car at T2 and issue the citation.

The ability to share reads across a fleet of patrollers in near real time may serve the purposes of detecting shared permit violation and overtime violations. In order to decrease the bandwidth and network load, the system may:

When doing permit enforcement, only share reads which are associated to a shared permit, or For overtime violation detection, V2 may only pull tire images when it has found a hit.

In one embodiment, access to the patrol manager service 620 Reads/Hits REST service is secure so user with unauthorized access cannot retrieve the available information. In one example the system is:

Protected by user credentials

Access to the patrol manager 620 REST service can be given by user privileges in the parking enforcement server 605.

The service may limit the amount of retrievable data by time (e.g. previous 48 hours maximum).

The service may implement a restrictive data query policy. E.g. to get information, the patroller service 610 must request something precise like specify which rule it requests the reads for).

In one embodiment, Reads/Hits REST service may be protected by basic authentication over HTTPS. To this end, the implementation may include:

That the REST service receives credential information in message header. These may include a username, a password, a patroller service 610 ID, etc.

Credential validation may also take into account user privileges.

Support for HTTPS (e.g. including use of directory certificates).

Addition of a port to host service.

In one example the system supports hit redirection from server to patroller. For example, when a patroller service 610 reads a plate and raises a hit, if a hotlist has a notification list and is linked to the server, then the hit transferred to the server is redirected to the notification list for other patroller services 610 on other patrol vehicles.

In one example the system supports spreading out indication of new wanted vehicles to patroller services 610. For example, a new wanted vehicle is entered in the server and is sent to patroller services 610 that are linked to it for notification of new wanted vehicles. Also a new wanted vehicle may be entered at a patroller service 610 and transferred to the central server for redirection.

Although the parking enforcement system 100 was described as mounted to a patrol vehicle 105, it may be provided mobility by other means such as by being mounted on a motorcycle, bicycle or backpack.

Although in this example the system was described in the context of a patroller service 610 provided on-board a vehicle, it is to be understood that variations may be included. For example, in an alternate embodiment the first or the local or shared readings may be generated on a different physical platform. In one example, the patroller service 610 may be provided on a portable computer, such as a smartphone, which has the adequate hardware and software systems such as location/positioning systems and license plate reading systems.

The above description has been provided for the purpose of illustrating, not limiting the invention.

What is claimed is:

1. A computer-implemented method for determining a shared parking permit violation by a mobile parking enforcement device, the mobile parking enforcement device comprising:
- a wireless interface for communicating wirelessly with a parking enforcement server;
- a data interface for communicating with parking data acquisition hardware to receive therefrom parking data;
- a processor in communication with the wireless interface and the data interface; and
- computer-readable memory in communication with and accessible by the processor, the method comprising:
- transmitting, via the wireless interface, a geographic location of the mobile parking enforcement device to the parking enforcement server;
- receiving, via the wireless interface of the mobile parking enforcement device, a set of one or more past parking events from the parking enforcement server, each past parking event in the set of one or more past parking events comprises a vehicle identifier, the set of one or more past parking events received from the parking enforcement server corresponding to one or more past parking events identified by the parking enforcement server as occurring in a parking zone associated with the geographic location of the mobile parking enforcement device;
- receiving, via the data interface, current parking data comprising a first vehicle identifier of a first vehicle from the parking data acquisition hardware to generate, at the processor, a current parking event comprising the first vehicle identifier of the first vehicle;
- searching, by the processor, for the first vehicle identifier in a permit list stored in the computer-readable memory of the mobile parking enforcement device, and identifying, at the processor, a shared parking permit associated with the first vehicle identifier, the shared parking permit further associated with at least a second vehicle identifier of a second vehicle different from the first vehicle;
- searching, by the processor, in past parking data comprising the set of one or more past parking events to obtain, at the processor, a particular past parking event comprising the second vehicle identifier;
- determining, at the processor, that a shared parking permit violation has occurred based on the current parking event with the first vehicle identifier and the particular past parking event with the second vehicle identifier; and
- storing a violation event for the shared parking permit violation in the computer-readable memory.

2. The method of claim 1, wherein said searching for the first vehicle identifier in a permit list stored in the computer-readable memory of the mobile parking enforcement device, and identifying the shared parking permit comprises:
- identifying a permit identifier associated with the first vehicle identifier in the permit list, the permit identifier further associated with the second vehicle identifier in the permit list.

3. The method of claim 2, wherein said searching in the past parking data to obtain the particular past parking event comprises searching in the past parking data for a parking event with the permit identifier and a vehicle identifier different from the first vehicle identifier.

4. The method of claim 1, further comprising receiving the permit list from the parking enforcement server.

5. The method of claim 4, wherein the permit list received from the parking enforcement server corresponds to the parking zone having a geographic area associated with the geographic location of the mobile parking enforcement device.

6. The method of claim 1, wherein the parking data acquisition hardware comprises at least one license plate reader, the first vehicle identifier is a first license plate number, the second vehicle identifier is a second license plate number, and the method further comprises capturing the first license plate number with the parking data acquisition hardware.

7. The method of claim 1, further comprising:
- determining, at the processor, a geographic location of the mobile parking enforcement device based at least in part on a determination by a Global Positioning System (GPS) unit.

8. The method of claim 1, wherein the particular past parking event is generated by a second parking enforcement device different from the parking enforcement device.

9. The method of claim 1, wherein said determining that the shared parking permit violation has occurred comprises determining that the current parking event and the particular past parking event occur within a time range.

10. The method of claim 9, wherein the time range is a day.

11. The method of claim 1, wherein the shared parking permit corresponds to a permit identifier associated with the first vehicle identifier and the second vehicle identifier in the permit list accessible by the processor.

12. The method of claim 1, wherein the past parking data comprises at least one past parking event generated by the mobile parking enforcement device.

13. The method of claim 1, wherein the geographic location of the mobile parking enforcement device is the parking zone.

14. A non-transitory computer-readable medium having stored thereon program instructions for determining a shared parking permit violation by a mobile parking enforcement device, the mobile parking enforcement device comprising:
- a wireless interface for communicating wirelessly with a parking enforcement server;
- a data interface for communicating with parking data acquisition hardware to receive therefrom parking data;
- a processor in communication with the wireless interface and the data interface; and
- computer-readable memory in communication with and accessible by the processor, the program instructions executable by the processor to perform:
- transmitting, via the wireless interface, a geographic location of the mobile parking enforcement device to the parking enforcement server;
- receiving, via the wireless interface of the mobile parking enforcement device, a set of one or more past parking events from the parking enforcement server, each past parking event in the set of one or more past parking events comprises a vehicle identifier, the set of one or more past parking events received from the parking enforcement server corresponding to one or more past parking events identified by the parking enforcement server as occurring in a parking zone associated with the geographic location of the mobile parking enforcement device;
- receiving, via the data interface, current parking data comprising a first vehicle identifier of a first vehicle from the parking data acquisition hardware to generate, at the processor, a current parking event comprising the first vehicle identifier of the first vehicle;

searching, by the processor, for the first vehicle identifier in a permit list stored in the computer-readable memory of the mobile parking enforcement device, and identifying, at the processor, a shared parking permit associated with the first vehicle identifier, the shared parking permit further associated with at least a second vehicle identifier of a second vehicle different from the first vehicle;

searching, by the processor, in past parking data comprising the set of one or more past parking events to obtain, at the processor, a particular past parking event comprising the second vehicle identifier;

determining, at the processor, that a shared parking permit violation has occurred based on the current parking event with the first vehicle identifier and the particular past parking event with the second vehicle identifier; and storing a violation event for the shared parking permit violation in computer-readable memory.

15. The non-transitory computer-readable medium of claim 14, wherein said searching for the first vehicle identifier in a permit list stored in the computer-readable memory of the mobile parking enforcement device, and identifying the shared parking permit comprises:

identifying a permit identifier associated with the first vehicle identifier in the permit list, the permit identifier further associated with the second vehicle identifier in the permit list.

16. The non-transitory computer-readable medium of claim 15, wherein said searching in the past parking data to obtain the particular past parking event comprises searching in the past parking data for a parking event with the permit identifier and a vehicle identifier different from the first vehicle identifier.

17. The non-transitory computer-readable medium of claim 14, further comprising program instructions executable by the processor to receive the permit list from the parking enforcement server.

18. The non-transitory computer-readable medium of claim 17, wherein the permit list received from the parking enforcement server corresponds to the parking zone having a geographic area associated with the geographic location of the mobile parking enforcement device.

19. The non-transitory computer-readable medium of claim 14, wherein the parking data acquisition hardware comprises at least one license plate reader, the first vehicle identifier is a first license plate number, the second vehicle identifier is a second license plate number, and further comprising program instructions executable by the processor to capture the first license plate number with the parking data acquisition hardware.

20. The non-transitory computer-readable medium of claim 14, further comprising program instructions executable by the processor to perform:

determining, at the processor, a geographic location of the mobile parking enforcement device based at least in part on a determination by a Global Positioning System (GPS) unit.

21. The non-transitory computer-readable medium of claim 14, wherein the particular past parking event is generated by a second parking enforcement device different from the parking enforcement device.

22. The non-transitory computer-readable medium of claim 14, wherein said determining that the shared parking permit violation has occurred comprises determining that the current parking event and the particular past parking event occur within a time range.

23. The non-transitory computer-readable medium of claim 22, wherein the time range is a day.

24. The non-transitory computer-readable medium of claim 14, wherein the shared parking permit corresponds to a permit identifier associated with the first vehicle identifier and the second vehicle identifier in the permit list accessible by the processor.

25. The non-transitory computer-readable medium of claim 14, wherein the past parking data comprises at least one past parking event generated by the mobile parking enforcement device.

26. The non-transitory computer-readable medium of claim 14, wherein the geographic location of the mobile parking enforcement device is the parking zone.

* * * * *